(12) United States Patent
Tang et al.

(10) Patent No.: US 8,395,691 B2
(45) Date of Patent: Mar. 12, 2013

(54) OPTICAL IMAGE-CAPTURING LENS ASSEMBLY

(75) Inventors: Hsiang Chi Tang, Taichung (TW); Dung Yi Hsieh, Taichung (TW); Chun Shan Chen, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 295 days.

(21) Appl. No.: 12/912,401

(22) Filed: Oct. 26, 2010

(65) Prior Publication Data
US 2012/0044403 A1 Feb. 23, 2012

(30) Foreign Application Priority Data
Aug. 20, 2010 (TW) .............................. 99127879 A

(51) Int. Cl.
*H04N 5/225* (2006.01)
*G02B 13/16* (2006.01)
*G02B 3/02* (2006.01)
*G02B 13/18* (2006.01)

(52) U.S. Cl. .................... 348/335; 348/340; 359/715

(58) Field of Classification Search .................. 348/335, 348/340, 360–362; 359/715, 716, 771, 772, 359/784
See application file for complete search history.

(56) References Cited

U.S. PATENT DOCUMENTS

| | | | | |
|---|---|---|---|---|
| 6,130,714 A * | 10/2000 | Abe et al. | ....................... | 348/335 |
| 7,609,313 B2 * | 10/2009 | Yamaguchi et al. | .......... | 348/335 |
| 7,916,401 B2 * | 3/2011 | Chen et al. | ...................... | 359/716 |
| 8,000,033 B1 * | 8/2011 | Tang et al. | ...................... | 359/716 |
| 8,077,400 B2 * | 12/2011 | Tang | ............................. | 359/716 |
| 8,081,393 B2 * | 12/2011 | Chen et al. | ...................... | 359/716 |
| 8,154,807 B2 * | 4/2012 | Tsai et al. | ...................... | 359/716 |
| 8,169,528 B2 * | 5/2012 | Chen et al. | ...................... | 348/335 |
| 8,174,777 B2 * | 5/2012 | Tang et al. | ...................... | 359/784 |
| 8,179,470 B2 * | 5/2012 | Chen et al. | ...................... | 348/335 |
| 8,179,615 B1 * | 5/2012 | Tang et al. | ...................... | 359/714 |
| 8,194,172 B2 * | 6/2012 | Tang et al. | ...................... | 348/340 |
| 8,199,418 B2 * | 6/2012 | Chen et al. | ...................... | 359/773 |
| 8,294,997 B2 * | 10/2012 | Tang et al. | ...................... | 359/773 |
| 8,310,770 B2 * | 11/2012 | Tang et al. | ...................... | 359/784 |
| 2004/0135917 A1 * | 7/2004 | Mihara | ........................ | 348/335 |
| 2005/0253952 A1 * | 11/2005 | Minefuji | ....................... | 348/335 |
| 2007/0146901 A1 | 6/2007 | Noda | | |
| 2010/0097709 A1 * | 4/2010 | Tsai | .............................. | 359/715 |
| 2010/0149404 A1 * | 6/2010 | Imamura et al. | .............. | 348/335 |

* cited by examiner

*Primary Examiner* — Kelly L Jerabek
(74) *Attorney, Agent, or Firm* — Morris, Manning & Martin, LLP; Tim Tingkang Xia, Esq.

(57) ABSTRACT

This invention provides an optical image-capturing lens assembly comprising, in order from an object side to an image side: a first lens element with positive refractive power; a second lens element with negative refractive power; a third lens element, the object-side and image-side surfaces thereof being aspheric; and a fourth lens element having a concave image-side surface, the object-side and image-side surfaces thereof being aspheric and at least one inflection point being formed on at least one of the object-side and image-side surfaces thereof. The present lens assembly is further provided with a stop and an electronic sensor for image formation of an object. The stop is disposed between the object and the second lens element, and the electronic sensor is disposed at an image plane.

29 Claims, 43 Drawing Sheets

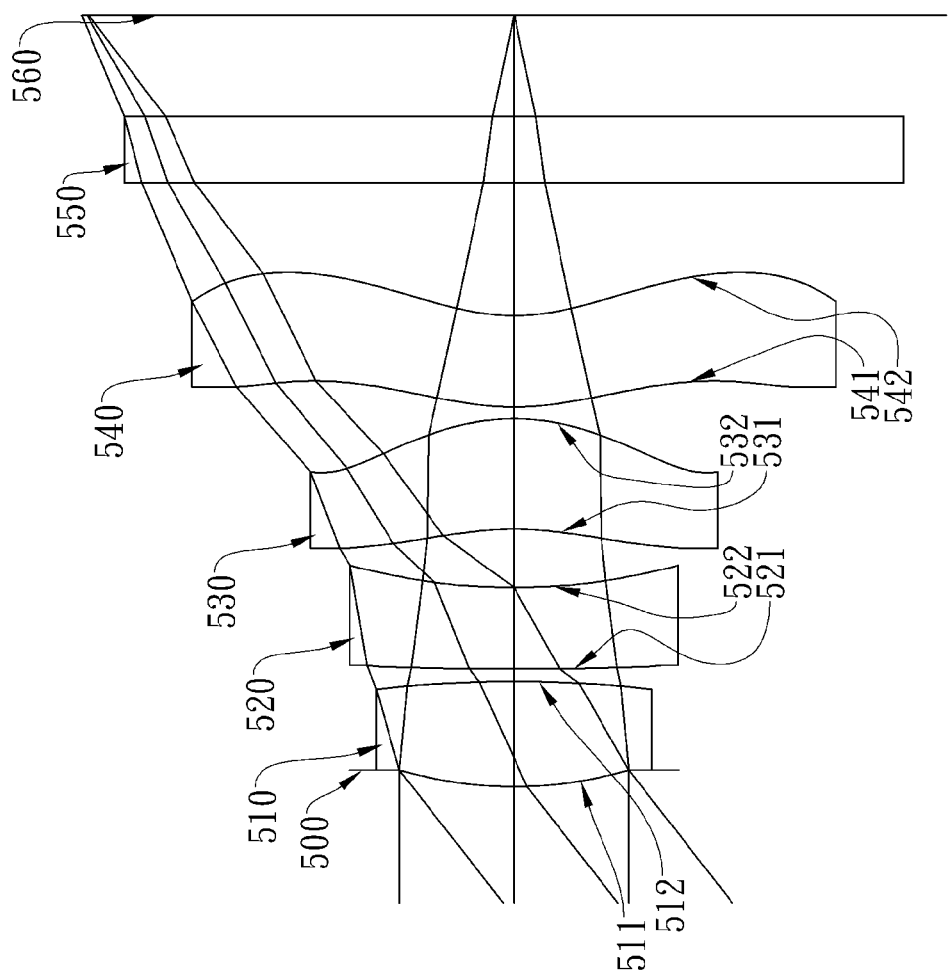

| TABLE 1 | | | | | | | |
|---|---|---|---|---|---|---|---|
| (Embodiment 1) | | | | | | | |
| f = 1.70 mm, Fno = 2.08, HFOV = 37.4 deg. | | | | | | | |
| Surface # | | Curvature Radius | Thickness | Material | Index | Abbe # | Focal length |
| 0 | Object | Plano | Infinity | | | | |
| 1 | Lens 1 | 1.381160 (ASP) | 0.365 | Plastic | 1.544 | 55.9 | 1.84 |
| 2 | | -3.305800 (ASP) | -0.030 | | | | |
| 3 | Ape. Stop | Plano | 0.143 | | | | |
| 4 | Lens 2 | -6.453700 (ASP) | 0.300 | Plastic | 1.632 | 23.4 | -3.51 |
| 5 | | 3.446500 (ASP) | 0.154 | | | | |
| 6 | Lens 3 | -1.758030 (ASP) | 0.559 | Plastic | 1.544 | 55.9 | 0.71 |
| 7 | | -0.353610 (ASP) | 0.035 | | | | |
| 8 | Lens 4 | -12.771400 (ASP) | 0.300 | Plastic | 1.544 | 55.9 | -0.77 |
| 9 | | 0.436290 (ASP) | 0.400 | | | | |
| 10 | IR-filter | Plano | 0.200 | Glass | 1.517 | 64.2 | - |
| 11 | | Plano | 0.183 | | | | |
| 12 | Image | Plano | - | | | | |
| Reference wavelength is d-line(587.6 nm) | | | | | | | |

Fig.11

| TABLE 2 | | | | |
|---|---|---|---|---|
| Aspheric Coefficients | | | | |
| Surface # | 1 | 2 | 4 | 5 |
| k = | 2.86599E-01 | -2.84512E+01 | -3.48023E+01 | -9.00000E+01 |
| A4 = | -2.76989E-02 | -1.74350E-01 | -2.25408E-01 | 6.18750E-01 |
| A6 = | -1.75332E+00 | -1.11168E+00 | -1.30707E+00 | -2.80776E+00 |
| A8 = | 9.49561E+00 | -1.06733E+01 | -9.07913E+00 | 2.89693E+00 |
| A10= | -2.88520E+01 | 3.80105E+01 | -4.59140E+01 | |
| A12= | | | 3.24279E+02 | |
| Surface # | 6 | 7 | 8 | 9 |
| k = | 2.62116E+00 | -3.44364E+00 | -2.54886E+01 | -7.20076E+00 |
| A4 = | 3.88977E-01 | -1.66278E+00 | -8.06590E-02 | -4.61820E-01 |
| A6 = | -7.15856E+00 | 5.81432E+00 | 1.57628E-01 | 9.26499E-01 |
| A8 = | 8.41104E+01 | -1.19323E+01 | -2.85593E-01 | -1.30819E+00 |
| A10= | -4.58251E+02 | -1.84334E+00 | 5.97417E-01 | 9.29505E-01 |
| A12= | 1.45190E+03 | 6.08768E+01 | -7.48121E-01 | -1.97767E-01 |
| A14= | -2.45457E+03 | -3.75970E+01 | 4.47603E-01 | -1.23109E-01 |
| A16= | 1.68424E+03 | -4.25701E+01 | -9.18277E-02 | 5.65292E-02 |

Fig.12

| TABLE 3 | | | | | | |
|---|---|---|---|---|---|---|
| (Embodiment 2) | | | | | | |
| f = 1.70 mm, Fno = 2.08, HFOV = 37.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.050 | | | | |
| 2 | Lens 1 | 1.337120 (ASP) | 0.390 | Plastic | 1.544 | 55.9 | 1.31 |
| 3 | | -1.366920 (ASP) | 0.040 | | | | |
| 4 | Lens 2 | -2.409530 (ASP) | 0.280 | Plastic | 1.632 | 23.4 | -2.24 |
| 5 | | 3.576900 (ASP) | 0.189 | | | | |
| 6 | Lens 3 | -1.250460 (ASP) | 0.489 | Plastic | 1.544 | 55.9 | 0.74 |
| 7 | | -0.348070 (ASP) | 0.035 | | | | |
| 8 | Lens 4 | -12.771400 (ASP) | 0.293 | Plastic | 1.544 | 55.9 | -0.77 |
| 9 | | 0.437800 (ASP) | 0.400 | | | | |
| 10 | IR-filter | Plano | 0.200 | Glass | 1.517 | 64.2 | - |
| 11 | | Plano | 0.185 | | | | |
| 12 | Image | Plano | - | | | | |
| Reference wavelength is d-line(587.6 nm) | | | | | | | |

Fig.13

| TABLE 4 | | | | |
|---|---|---|---|---|
| Aspheric Coefficients | | | | |
| Surface # | 2 | 3 | 4 | 5 |
| k = | -3.23324E-01 | -3.06150E+01 | -9.00000E-01 | 2.31830E+01 |
| A4 = | -1.70743E-01 | 5.52590E-01 | 1.10740E+00 | 8.70524E-01 |
| A6 = | 9.91449E-01 | -1.25878E+01 | -1.29502E-01 | -5.53751E+00 |
| A8 = | -8.92126E+00 | 4.32350E+01 | 1.73543E+01 | 7.66430E+00 |
| A10= | 5.70288E+00 | -5.09241E+01 | 8.19120E+01 | |
| A12= | | | -1.62973E-02 | |
| Surface # | 6 | 7 | 8 | 9 |
| k = | -1.71704E-02 | -3.40128E+00 | 1.00000E+00 | -7.42606E+00 |
| A4 = | 5.66047E-01 | -1.67403E+00 | -2.06303E-01 | -5.74559E-01 |
| A6 = | -7.08427E+00 | 5.93336E+00 | 3.18073E-01 | 1.16114E+00 |
| A8 = | 8.23010E+01 | -1.10874E+01 | -4.39388E-01 | -1.64979E+00 |
| A10= | -4.68838E+02 | -3.24147E+00 | 5.33147E-01 | 1.18378E+00 |
| A12= | 1.48715E+03 | 6.53755E+01 | -6.08195E-01 | -2.36977E-01 |
| A14= | -2.40440E+03 | -2.81781E+01 | 6.03692E-01 | -1.90304E-01 |
| A16= | 1.53953E+03 | -7.30940E+01 | -2.40018E-01 | 8.72123E-02 |

Fig.14

| TABLE 5 | | | | | | | |
|---|---|---|---|---|---|---|---|
| (Embodiment 3) | | | | | | | |
| f = 1.99 mm, Fno = 2.80, HFOV = 37.1 deg. | | | | | | | |
| Surface # | | Curvature Radius | Thickness | Material | Index | Abbe # | Focal length |
| 0 | Object | Plano | Infinity | | | | |
| 1 | Lens 1 | 2.658000 (ASP) | 0.492 | Plastic | 1.544 | 55.9 | 1.55 |
| 2 | | -1.159000 (ASP) | -0.032 | | | | |
| 3 | Ape. Stop | Plano | 0.109 | | | | |
| 4 | Lens 2 | 3.733200 (ASP) | 0.254 | Plastic | 1.650 | 21.4 | -2.68 |
| 5 | | 1.155910 (ASP) | 0.281 | | | | |
| 6 | Lens 3 | -1.414600 (ASP) | 0.519 | Plastic | 1.544 | 55.9 | 0.79 |
| 7 | | -0.370890 (ASP) | 0.084 | | | | |
| 8 | Lens 4 | -1.118190 (ASP) | 0.357 | Plastic | 1.544 | 55.9 | -0.77 |
| 9 | | 0.740740 (ASP) | 0.300 | | | | |
| 10 | IR-filter | Plano | 0.200 | Glass | 1.517 | 64.2 | - |
| 11 | | Plano | 0.275 | | | | |
| 12 | Image | Plano | - | | | | |
| Reference wavelength is d-line(587.6 nm) | | | | | | | |

Fig.15

| TABLE 6A | | | | |
|---|---|---|---|---|
| Aspheric Coefficients | | | | |
| Surface # | 1 | 2 | 4 | 5 |
| k = | -2.00000E+01 | -1.18037E+01 | -1.00000E+00 | -2.16748E+00 |
| A4 = | -1.40677E-01 | -3.58636E-01 | 6.44675E-01 | 3.58458E-01 |
| A6 = | -8.99159E-01 | -2.39523E+00 | -5.92893E+00 | -9.10204E-01 |
| A8 = | 3.37453E+00 | 1.07295E+01 | 2.12809E+01 | -3.81346E+00 |
| A10= | -1.68795E+01 | -1.05713E+01 | -5.84593E+01 | 2.21104E+01 |
| A12= | 2.73213E+01 | -5.55151E+01 | 2.25800E+02 | -2.05282E+01 |
| A14= | -1.87080E+01 | 1.31285E+02 | -2.35757E+02 | 4.02539E+01 |
| Surface # | 6 | 7 | 8 | |
| k = | 1.24567E+00 | -2.83750E+00 | -2.00000E+01 | |
| A4 = | -2.80474E-01 | -1.02591E+00 | 2.19459E-01 | |
| A6 = | 3.35964E+00 | 2.80927E+00 | -1.40293E+00 | |
| A8 = | -1.02169E+01 | -6.47748E+00 | 2.43177E+00 | |
| A10= | 4.95040E+01 | 7.81334E+00 | -1.51147E+00 | |
| A12= | -1.09671E+02 | 1.42641E+01 | -8.87277E-01 | |
| A14= | 8.33327E+01 | -2.10416E+01 | 1.19149E+00 | |

Fig.16A

| TABLE 6B | |
|---|---|
| Aspheric Coefficients | |
| Surface # | 9 |
| k = | -1.25440E+01 |
| A1 = | |
| A2 = | |
| A3 = | |
| A4 = | -2.95687E-01 |
| A5 = | |
| A6 = | 3.39682E-01 |
| A7 = | |
| A8 = | -5.66265E-01 |
| A9 = | |
| A10= | 5.71051E-01 |
| A11= | |
| A12= | -3.34546E-01 |
| A13= | |
| A14= | 8.19871E-02 |

Fig.16B

| TABLE 7 | | | | | | | |
|---|---|---|---|---|---|---|---|
| (Embodiment 4) | | | | | | | |
| f = 2.23 mm, Fno = 2.82, HFOV = 37.2 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.020 | | | | |
| 2 | Lens 1 | 1.508450 (ASP) | 0.371 | Plastic | 1.544 | 55.9 | 1.83 |
| 3 | | -2.667420 (ASP) | 0.071 | | | | |
| 4 | Lens 2 | 3.310000 (ASP) | 0.250 | Plastic | 1.632 | 23.4 | -3.07 |
| 5 | | 1.188440 (ASP) | 0.310 | | | | |
| 6 | Lens 3 | -1.838170 (ASP) | 0.359 | Plastic | 1.530 | 55.8 | 15.07 |
| 7 | | -1.595280 (ASP) | 0.117 | | | | |
| 8 | Lens 4 | 0.840870 (ASP) | 0.445 | Plastic | 1.530 | 55.8 | 11.32 |
| 9 | | 0.798630 (ASP) | 0.400 | | | | |
| 10 | IR-filter | Plano | 0.300 | Glass | 1.517 | 64.2 | - |
| 11 | | Plano | 0.279 | | | | |
| 12 | Image | Plano | - | | | | |
| Reference wavelength is d-line(587.6 nm) | | | | | | | |

Fig.17

| TABLE 8 | | | | |
|---|---|---|---|---|
| Aspheric Coefficients | | | | |
| Surface # | 2 | 3 | 4 | 5 |
| k = | -3.04332E+00 | 1.83762E+01 | -4.69078E+01 | -1.00753E+00 |
| A4 = | -1.15665E-01 | -2.94230E-01 | -2.05691E-01 | -7.82692E-02 |
| A6 = | -3.44243E-01 | -1.21934E-01 | 6.42737E-02 | 2.20790E-02 |
| A8 = | -2.32323E+00 | 3.20977E-01 | 1.34165E+00 | 5.32663E-01 |
| A10= | 4.78052E-01 | 3.19377E-01 | 8.55307E-01 | 4.94608E-01 |
| A12= | 5.26293E-01 | -9.13179E-01 | 1.09198E-02 | 5.63984E-01 |
| A14= | -1.51362E+00 | -9.67048E+00 | -9.05399E+00 | -1.43771E+00 |
| A16= | -4.91425E+01 | 5.59140E-01 | -4.87630E+00 | -4.58672E+00 |
| Surface # | 6 | 7 | 8 | 9 |
| k = | -5.39061E+01 | -2.00624E+00 | -4.93252E+00 | -4.20846E+00 |
| A4 = | 3.14815E-02 | -5.53052E-02 | -3.15481E-01 | -2.05052E-01 |
| A6 = | -1.99263E-01 | -6.29989E-03 | 1.34431E-01 | 5.13771E-02 |
| A8 = | 8.22308E-02 | 5.22778E-01 | 1.32588E-03 | -8.01084E-03 |
| A10= | 1.13090E-01 | -6.10818E-01 | -8.57299E-03 | -3.01098E-03 |
| A12= | 8.64486E-02 | 6.41939E-01 | -2.17974E-03 | -1.68368E-03 |
| A14= | -5.85325E-01 | -5.29206E-01 | 2.05299E-03 | 1.51990E-03 |
| A16= | -1.61891E+00 | 8.88216E-02 | -3.66771E-04 | -2.00881E-04 |

Fig.18

| TABLE 9 | | | | | | |
|---|---|---|---|---|---|---|
| (Embodiment 5) | | | | | | |
| f = 1.66 mm, Fno = 2.40, HFOV= 37.9 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.050 | | | | |
| 2 | Lens 1 | 1.143640 (ASP) | 0.317 | Plastic | 1.544 | 55.9 | 1.55 |
| 3 | | -2.871440 (ASP) | 0.038 | | | | |
| 4 | Lens 2 | -28.402700 (ASP) | 0.245 | Plastic | 1.650 | 21.4 | -3.27 |
| 5 | | 2.305860 (ASP) | 0.175 | | | | |
| 6 | Lens 3 | -0.956300 (ASP) | 0.333 | Plastic | 1.544 | 55.9 | 2.76 |
| 7 | | -0.655600 (ASP) | 0.035 | | | | |
| 8 | Lens 4 | 0.800240 (ASP) | 0.275 | Plastic | 1.544 | 55.9 | -8.26 |
| 9 | | 0.597000 (ASP) | 0.400 | | | | |
| 10 | IR-filter | Plano | 0.200 | Glass | 1.517 | 64.2 | - |
| 11 | | Plano | 0.305 | | | | |
| 12 | Image | Plano | - | | | | |
| Reference wavelength is d-line(587.6 nm) | | | | | | | |

Fig.19

| TABLE 10A | | | | |
|---|---|---|---|---|
| Aspheric Coefficients | | | | |
| Surface # | 2 | 3 | 4 | 5 |
| k = | -8.17924E-01 | -4.27735E+01 | -1.00000E-00 | 1.70589E+01 |
| A4 = | -8.57489E-02 | 1.04459E+00 | 1.41358E+00 | 8.67864E-01 |
| A6 = | 5.64424E-02 | -1.15066E+01 | -1.16712E-01 | -5.92400E+00 |
| A8 = | -1.14995E+00 | 4.14383E+01 | 2.43447E+01 | 7.07706E+00 |
| A10= | -1.67856E+01 | -4.09511E+01 | 8.19668E+01 | 1.57690E+00 |
| A12= | | | -2.18922E-02 | |
| Surface # | 6 | 7 | 8 | |
| k | -1.10987E+01 | -4.42490E+00 | -9.54380E-00 | |
| A4 = | 9.74192E-01 | -1.17327E+00 | -5.29360E-01 | |
| A6 = | -7.47122E+00 | 6.19541E+00 | 3.95673E-01 | |
| A8 = | 7.93685E+01 | -1.05400E+01 | -3.56901E-01 | |
| A10= | -4.74000E+02 | -2.67277E+00 | 5.85807E-01 | |
| A12= | 1.48022E+03 | 6.22581E+01 | -5.58714E-01 | |
| A14= | -2.38941E+03 | -3.76255E+01 | 6.10482E-01 | |
| A16 | 1.68465E+03 | -9.18352E+01 | -3.58105E-01 | |

Fig.20A

| TABLE 10B | |
|---|---|
| Aspheric Coefficients | |
| Surface # | 9 |
| k = | -5.18369E+00 |
| A1 = | |
| A2 = | |
| A3 = | |
| A4 = | -6.80412E-01 |
| A5 = | |
| A6 = | 1.05932E+00 |
| A7 = | |
| A8 = | -1.53316E+00 |
| A9 | |
| A10= | 1.22450E+00 |
| A11= | |
| A12= | -3.11784E-01 |
| A13= | |
| A14= | -2.76994E-01 |
| A15= | |
| A16= | 1.70607E-01 |

Fig.20B

| TABLE 11 | | | | | | | |
|---|---|---|---|---|---|---|---|
| (Embodiment 6) | | | | | | | |
| f = 2.06 mm, Fno = 2.45, HFOV = 33.0 deg. | | | | | | | |
| Surface # | | Curvature Radius | Thickness | Material | Index | Abbe # | Focal length |
| 0 | Object | Plano | Infinity | | | | |
| 1 | Lens 1 | 3.277700 (ASP) | 0.642 | Plastic | 1.544 | 55.9 | 1.61 |
| 2 | | -1.110150 (ASP) | -0.035 | | | | |
| 3 | Ape. Stop | Plano | 0.108 | | | | |
| 4 | Lens 2 | -50.000000 (ASP) | 0.300 | Plastic | 1.632 | 23.4 | -2.36 |
| 5 | | 1.541360 (ASP) | 0.275 | | | | |
| 6 | Lens 3 | -1.684030 (ASP) | 0.564 | Plastic | 1.544 | 55.9 | 0.88 |
| 7 | | -0.416700 (ASP) | 0.078 | | | | |
| 8 | Lens 4 | -2.111120 (ASP) | 0.350 | Plastic | 1.544 | 55.9 | -0.98 |
| 9 | | 0.757750 (ASP) | 0.400 | | | | |
| 10 | IR-filter | Plano | 0.200 | Glass | 1.517 | 64.2 | - |
| 11 | | Plano | 0.325 | | | | |
| 12 | Image | Plano | - | | | | |
| Reference wavelength is d-line(587.6 nm) | | | | | | | |

Fig.21

| TABLE 12 | | | | |
| --- | --- | --- | --- | --- |
| Aspheric Coefficients | | | | |
| Surface # | 1 | 2 | 4 | 5 |
| k = | -2.00000E+01 | -1.30140E+01 | 4.84989E-11 | -6.63003E+00 |
| A4 = | -8.49695E-03 | -2.46704E-01 | 6.11602E-01 | 1.96895E-01 |
| A6 = | -8.72769E-01 | -2.07205E+00 | -6.35384E+00 | -1.23209E+00 |
| A8 = | 4.59729E+00 | 8.09800E+00 | 1.99713E+01 | -3.24890E-02 |
| A10= | -1.61741E+01 | -3.65662E+00 | -6.94917E+01 | 5.09116E+00 |
| A12= | 2.35398E+01 | -5.55148E+01 | 2.25800E+02 | -2.04731E+01 |
| A14= | -1.36896E+01 | 1.31285E+02 | -2.35757E+02 | 3.98754E+01 |
| Surface # | 6 | 7 | 8 | 9 |
| k = | 7.27212E-01 | -2.99796E+00 | -2.00000E+01 | -1.17437E+01 |
| A4 = | -2.18384E-01 | -9.70549E-01 | 3.48234E-01 | -3.15646E-01 |
| A6 = | 3.39735E+00 | 2.96848E+00 | -1.62369E+00 | 3.57923E-01 |
| A8 = | -1.08926E+01 | -6.44738E+00 | 2.56874E+00 | -5.65053E-01 |
| A10= | 4.63732E+01 | 7.44014E+00 | -1.38248E+00 | 5.54740E-01 |
| A12= | -1.08291E+02 | 1.36247E+01 | -9.44352E-01 | -3.05743E-01 |
| A14= | 9.03563E+01 | -2.10326E+01 | 1.00003E+00 | 6.46675E-02 |

Fig.22

| TABLE 13 | | | | | | | |
|---|---|---|---|---|---|---|---|
| (Embodiment 7) | | | | | | | |
| f = 2.30 mm, Fno = 2.85, HFOV = 37.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.050 | | | | |
| 2 | Lens 1 | 1.093390 (ASP) | 0.373 | Plastic | 1.544 | 55.9 | 1.83 |
| 3 | | -9.710200 (ASP) | 0.050 | | | | |
| 4 | Lens 2 | 3.831800 (ASP) | 0.253 | Plastic | 1.650 | 21.4 | -3.69 |
| 5 | | 1.436280 (ASP) | 0.358 | | | | |
| 6 | Lens 3 | -1.836580 (ASP) | 0.366 | Plastic | 1.544 | 55.9 | -15.47 |
| 7 | | -2.514280 (ASP) | 0.050 | | | | |
| 8 | Lens 4 | 0.851600 (ASP) | 0.466 | Plastic | 1.544 | 55.9 | 6.93 |
| 9 | | 0.887860 (ASP) | 0.400 | | | | |
| 10 | IR-filter | Plano | 0.200 | Glass | 1.517 | 64.2 | - |
| 11 | | Plano | 0.297 | | | | |
| 12 | Image | Plano | - | | | | |
| Reference wavelength is d-line(587.6 nm) | | | | | | | |

Fig.23

| TABLE 14 | | | | |
|---|---|---|---|---|
| Aspheric Coefficients | | | | |
| Surface # | 2 | 3 | 4 | 5 |
| k = | -8.25830E-01 | 1.43017E+02 | -1.03162E+02 | 3.81320E-01 |
| A4 = | -2.19534E-02 | -6.74141E-01 | -3.31458E-01 | 1.68708E-02 |
| A6 = | -1.00995E+00 | -9.55399E-02 | 2.71734E-01 | -6.66957E-02 |
| A8 = | 1.70252E+00 | 2.55890E+00 | 3.36564E+00 | 1.47163E-00 |
| A10= | 3.57144E+00 | 7.25325E+00 | 3.80927E+00 | 3.40881E-00 |
| A12= | -5.42620E+01 | -3.76433E-01 | 5.14414E+00 | 7.12780E-00 |
| A14= | -3.10646E+00 | -1.52086E-02 | -5.10666E+01 | -1.22629E+01 |
| A16= | -5.89702E+01 | 2.31182E+00 | -4.16431E+02 | -1.12661E+02 |
| Surface # | 6 | 7 | 8 | 9 |
| k = | -5.71056E+01 | -3.12496E-00 | -6.56120E+00 | -5.03138E+00 |
| A4 = | 5.61259E-02 | -1.30579E-01 | -3.00050E-01 | -2.06453E-01 |
| A6 = | -6.73551E-01 | 4.31978E-01 | 1.51598E-01 | 4.60498E-02 |
| A8 = | -6.70556E-02 | -4.47685E-01 | -2.18794E-05 | -9.77042E-03 |
| A10= | -2.49807E+00 | -9.32105E-01 | -9.72982E-03 | 2.69104E-03 |
| A12= | 1.87331E-01 | 1.21174E+00 | -2.48247E-03 | -2.34054E-04 |
| A14= | 1.13409E+01 | 9.34676E-03 | 1.97856E-03 | 1.40770E-03 |
| A16= | -3.39406E+01 | -3.87311E-01 | -3.32074E-04 | -5.03115E-04 |

Fig.24

| TABLE 15 | | | | | | |
|---|---|---|---|---|---|---|
| (Embodiment 8) | | | | | | |
| f = 2.42 mm, Fno = 2.60, HFOV = 38.5 deg. | | | | | | |
| Surface # | | Curvature Radius | Thickness | Material | Index | Abbe # | Focal length |
| 0 | Object | Plano | Infinity | | | | |
| 1 | Lens 1 | 0.935890 (ASP) | 0.473 | Plastic | 1.544 | 55.9 | 1.82 |
| 2 | | 13.533600 (ASP) | 0.026 | | | | |
| 3 | Ape. Stop | Plano | 0.026 | | | | |
| 4 | Lens 2 | -49.522900 (ASP) | 0.250 | Plastic | 1.634 | 23.8 | -5.27 |
| 5 | | 3.588000 (ASP) | 0.315 | | | | |
| 6 | Lens 3 | -2.002710 (ASP) | 0.654 | Plastic | 1.544 | 55.9 | 1.40 |
| 7 | | -0.615390 (ASP) | 0.173 | | | | |
| 8 | Lens 4 | -1.423330 (ASP) | 0.281 | Plastic | 1.544 | 55.9 | -1.14 |
| 9 | | 1.184190 (ASP) | 0.300 | | | | |
| 10 | IR-filter | Plano | 0.210 | Glass | 1.517 | 64.2 | - |
| 11 | | Plano | 0.196 | | | | |
| 12 | Image | Plano | - | | | | |
| Reference wavelength is d-line(587.6 nm) | | | | | | | |

Fig.25

| TABLE 16 | | | | |
|---|---|---|---|---|
| Aspheric Coefficients | | | | |
| Surface # | 1 | 2 | 4 | 5 |
| k = | -4.99156E+00 | -4.27170E+01 | -1.00000E+00 | -2.10137E+01 |
| A4 = | 7.33182E-01 | 1.60427E-01 | 4.12538E-01 | 5.53745E-01 |
| A6 = | -1.21990E+00 | -6.24064E-01 | -1.92176E+00 | -3.03383E-01 |
| A8 = | 3.79858E+00 | -3.41875E+00 | 1.17108E+01 | -7.81498E-01 |
| A10= | -1.30076E+01 | 1.76722E+01 | -7.56511E+01 | 9.74469E+00 |
| A12= | 3.05598E+01 | -5.64111E+01 | 2.16991E+02 | -1.92533E+01 |
| A14= | -3.52751E+01 | 5.77724E+01 | -2.13745E+02 | 1.79974E+01 |
| Surface # | 6 | 7 | 8 | 9 |
| k = | -2.46968E+01 | -4.20252E+00 | -6.40039E-01 | -1.78871E+01 |
| A4 = | -7.96655E-01 | -1.01602E+00 | -3.66795E-01 | -3.09575E-01 |
| A6 = | 2.51621E+00 | 2.12388E+00 | 2.86387E-01 | 2.19955E-01 |
| A8 = | -1.66962E+01 | -3.95221E+00 | 5.13977E-02 | -1.57427E-01 |
| A10= | 5.27714E+01 | 3.83752E+00 | -1.01911E-01 | 5.43880E-02 |
| A12= | -8.13764E+01 | -1.36504E+00 | 4.11797E-02 | -6.46526E-03 |
| A14= | 2.17197E+01 | 8.05457E-02 | -7.47915E-03 | -1.37214E-03 |

Fig.26

| TABLE 17 | | | | | | | |
|---|---|---|---|---|---|---|---|
| (Embodiment 9) | | | | | | | |
| f = 1.71 mm, Fno = 2.40, HFOV = 37.2 deg. | | | | | | | |
| Surface # | | Curvature Radius | Thickness | Material | Index | Abbe # | Focal length |
| 0 | Object | Plano | Infinity | | | | |
| 1 | Lens 1 | 1.119670 (ASP) | 0.364 | Plastic | 1.544 | 55.9 | 1.99 |
| 2 | | -29.001800 (ASP) | 0.010 | | | | |
| 3 | Ape. Stop | Plano | 0.126 | | | | |
| 4 | Lens 2 | -6.472300 (ASP) | 0.266 | Plastic | 1.632 | 23.4 | -3.17 |
| 5 | | 2.945690 (ASP) | 0.114 | | | | |
| 6 | Lens 3 | -1.851590 (ASP) | 0.571 | Plastic | 1.544 | 55.9 | 0.71 |
| 7 | | -0.354390 (ASP) | 0.035 | | | | |
| 8 | Lens 4 | 7.540000 (ASP) | 0.279 | Plastic | 1.544 | 55.9 | -0.82 |
| 9 | | 0.414140 (ASP) | 0.400 | | | | |
| 10 | IR-filter | Plano | 0.200 | Glass | 1.517 | 64.2 | - |
| 11 | | Plano | 0.233 | | | | |
| 12 | Image | Plano | - | | | | |
| Reference wavelength is d-line(587.6 nm) | | | | | | | |

Fig.27

| TABLE 18 | | | | |
|---|---|---|---|---|
| Aspheric Coefficients | | | | |
| Surface # | 1 | 2 | 4 | 5 |
| k = | 4.53612E-01 | -5.92162E+01 | -1.20755E-02 | -7.03344E+01 |
| A4 = | -1.08014E-02 | -3.51374E-01 | -7.97006E-01 | 4.24476E-01 |
| A6 = | -1.03924E+00 | -9.06566E-01 | -2.49280E+00 | -2.15450E+00 |
| A8 = | 5.56582E+00 | -1.92781E+01 | -1.50933E+01 | 1.86518E-00 |
| A10= | -2.46086E+01 | 7.98257E+01 | 1.82359E+01 | |
| A12= | | | 1.52493E+02 | |
| Surface # | 6 | 7 | 8 | 9 |
| k = | -1.85080E+00 | -3.59229E+00 | -1.00000E+00 | -6.48056E+00 |
| A4 = | 5.36595E-01 | -1.65921E+00 | -1.65738E-01 | -4.54506E-01 |
| A6 = | -6.74608E+00 | 5.82313E+00 | 2.29559E-01 | 9.02480E-01 |
| A8 = | 8.30011E+01 | -1.16250E+01 | -2.57305E-01 | -1.26498E+00 |
| A10= | -4.61837E+02 | -1.56874E+00 | 5.95438E-01 | 9.28973E-01 |
| A12= | 1.44636E+03 | 6.01900E+01 | -7.59239E-01 | -2.01332E-01 |
| A14= | -2.45248E+03 | -4.04516E+01 | 4.39061E-01 | -1.22167E-01 |
| A16= | 1.72263E+03 | -4.52314E+01 | -9.39591E-02 | 5.70308E-02 |

Fig.28

| TABLE 19 | | | | | | |
|---|---|---|---|---|---|---|
| (Embodiment 10) | | | | | | |
| f = 2.03 mm, Fno = 2.47, HFOV = 37.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.070 | | | | |
| 2 | Lens 1 | 1.098910 (ASP) | 0.363 | Plastic | 1.544 | 55.9 | 1.58 |
| 3 | | -3.494100 (ASP) | 0.047 | | | | |
| 4 | Lens 2 | -100.000000 (ASP) | 0.280 | Plastic | 1.634 | 23.8 | -2.69 |
| 5 | | 1.734570 (ASP) | 0.233 | | | | |
| 6 | Lens 3 | -1.424210 (ASP) | 0.345 | Plastic | 1.544 | 55.9 | 1.26 |
| 7 | | -0.501730 (ASP) | 0.035 | | | | |
| 8 | Lens 4 | 1.924270 (ASP) | 0.280 | Plastic | 1.544 | 55.9 | -1.33 |
| 9 | | 0.500000 (ASP) | 0.300 | | | | |
| 10 | IR-filter | Plano | 0.600 | Glass | 1.517 | 64.2 | - |
| 11 | | Plano | 0.187 | | | | |
| 12 | Image | Plano | - | | | | |
| Reference wavelength is d-line(587.6 nm) | | | | | | | |

Fig.29

| TABLE 20A | | | | |
|---|---|---|---|---|
| Aspheric Coefficients | | | | |
| Surface # | 2 | 3 | 4 | 5 |
| k = | 2.97321E-02 | -9.00000E+01 | -9.00000E-01 | 7.05808E-00 |
| A4 = | -1.13966E-01 | -3.75169E-01 | -1.48490E-01 | 1.55471E-01 |
| A6 = | -8.55608E-01 | -2.07397E+00 | -1.32020E-00 | -2.13477E+00 |
| A8 = | 8.04564E+00 | 1.43724E+01 | 4.08578E+00 | 2.89445E-00 |
| A10= | -4.18743E+01 | -4.11569E+01 | 2.25282E+01 | |
| A12 | | | -6.34990E 01 | |
| Surface # | 6 | 7 | | |
| k = | -1.77122E+01 | -4.90876E+00 | | |
| A4 = | 6.01772E-01 | -4.23978E-01 | | |
| A6 = | -1.35215E+00 | 4.23456E+00 | | |
| A8 = | 2.42426E+01 | -5.67299E+00 | | |
| A10= | -1.70771E+02 | -5.09005E+00 | | |
| A12= | 4.35193E+02 | 1.45152E+01 | | |
| A14= | -3.08755E+02 | -4.29960E+00 | | |
| A16= | -2.63932E+02 | -4.77137E+00 | | |

Fig.30A

| TABLE 20B | | |
|---|---|---|
| Aspheric Coefficients | | |
| Surface # | 8 | 9 |
| k = | 5.52783E-01 | -6.22510E+00 |
| A1 = | | |
| A2 = | | |
| A3 = | | |
| A4 = | -7.02958E-01 | -5.28576E-01 |
| A5 = | | |
| A6 = | 6.56141E-01 | 7.35171E-01 |
| A7 = | | |
| A8 = | -2.28323E-01 | -8.35176E-01 |
| A9 = | | |
| A10= | 1.95165E-02 | 5.09231E-01 |
| A11= | | |
| A12= | -1.44396E-01 | -7.14551E-02 |
| A13= | | |
| A14= | 1.89115E-01 | -8.83985E-02 |
| A15= | | |
| A16= | -6.52038E-02 | 3.63267E-02 |

Fig.30B

TABLE 21

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f | 1.70 | 1.70 | 1.99 | 2.23 | 1.66 | 2.06 | 2.30 | 2.42 | 1.71 | 2.03 |
| Fno | 2.08 | 2.08 | 2.80 | 2.82 | 2.40 | 2.45 | 2.85 | 2.60 | 2.40 | 2.47 |
| HFOV | 37.4 | 37.5 | 37.1 | 37.2 | 37.9 | 33.0 | 37.0 | 38.5 | 37.2 | 37.5 |
| V1−V2 | 32.5 | 32.5 | 34.5 | 32.5 | 34.5 | 32.5 | 34.5 | 32.1 | 32.5 | 32.1 |
| R8/f | 0.26 | 0.26 | 0.37 | 0.36 | 0.36 | 0.37 | 0.39 | 0.49 | 0.24 | 0.25 |
| (f/f3) − (f/f1) | 1.47 | 1.00 | 1.24 | −1.07 | −0.47 | 1.06 | −1.41 | 0.40 | 1.55 | 0.33 |
| CT2 (mm) | 0.300 | 0.280 | 0.254 | 0.250 | 0.245 | 0.300 | 0.253 | 0.250 | 0.266 | 0.280 |
| TTL (mm) | 2.54 | 2.43 | 2.77 | 2.80 | 2.25 | 3.14 | 2.74 | 2.83 | 2.53 | 2.47 |
| TTL/(ImgH*CT2)$^{1/2}$ | 4.09 | 4.05 | 4.49 | 4.30 | 4.01 | 4.99 | 4.12 | 4.08 | 4.33 | 3.76 |
| SL/TTL | 0.87 | 0.98 | 0.83 | 0.99 | 0.98 | 0.81 | 0.98 | 0.82 | 0.85 | 0.97 |
| Yc1/ImgH | 0.75 | 0.72 | 0.72 | 0.76 | 0.65 | - | 0.75 | 0.70 | 0.72 | 0.66 |
| Yc2/ImgH | 0.77 | 0.75 | - | 0.78 | 0.67 | - | - | 0.71 | 0.75 | 0.69 |

Fig. 31

OPTICAL IMAGE-CAPTURING LENS ASSEMBLY

CROSS-REFERENCE TO RELATED APPLICATIONS

This non-provisional application claims priority under 35 U.S.C. §119(a) on Patent Application No(s). 099127879 filed in Taiwan, R.O.C. on Aug. 20, 2010, the entire contents of which are hereby incorporated by reference.

BACKGROUND OF THE INVENTION

1. Field of the Invention

The present invention relates to an optical image-capturing lens assembly, and more particularly, to a compact optical image-capturing lens assembly used in an electronic product.

2. Description of the Prior Art

In recent years, with the popularity of portable electronic products featuring photographing function, the demand for compact imaging lenses is increasing, and the sensor of a general photographing camera is none other than CCD (charge coupled device) or CMOS device (Complementary Metal Oxide Semiconductor device). Furthermore, as advances in semiconductor manufacturing technology have allowed the pixel size of sensors to be reduced, and the resolution of compact imaging lenses has gradually increased, there is an increasing demand for compact imaging lenses featuring better image quality.

A conventional compact imaging lens assembly for portable electronic products, such as the one disclosed in U.S. Pat. No. 7,145,736, generally comprises three lens elements, in order from an object side to an image side: a first lens element with positive refractive power, a second lens element with negative refractive power, and a third lens element with positive refractive power. However, as advances in semiconductor manufacturing technology will never stop while electronic products are becoming even more compact at the same time, the pixel size of sensors will only become even smaller and the standard for image quality even higher. A conventional lens assembly comprising three lens elements, therefore, is not applicable for higher-end lens modules. U.S. Pat. No. 7,365,920 has disclosed a lens assembly comprising four lens elements, wherein the first and second lens elements are adhered by means of two glass spherical surface lenses to form a doublet so as to correct chromatic aberrations. Such an arrangement of optical elements, however, has the following disadvantages: (1) the degree of freedom in arranging the lens system is curtailed due to the employment of excess number of glass spherical surface lenses; thus, the total track length of the system cannot be reduced easily; (2) the process of adhering glass lenses together is complicated, posing difficulties in manufacture.

SUMMARY OF THE INVENTION

The present invention provides an optical image-capturing lens assembly comprising, in order from an object side to an image side: a first lens element with positive refractive power; a second lens element with negative refractive power; a third lens element, the object-side and image-side surfaces thereof being aspheric; and a fourth lens element having a concave image-side surface, the object-side and image-side surfaces thereof being aspheric and at least one inflection point being formed on at least one of the object-side and image-side surfaces thereof, wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the stop and the electronic sensor is SL, a distance on the optical axis between the object-side surface of the first lens element and the electronic sensor is TTL, and they satisfy the following relations: $0.35<Yc1/ImgH<0.95$; $0.70<SL/TTL<1.20$.

Moreover, the present invention provides an optical image-capturing lens assembly comprising, in order from an object side to an image side: a first lens element with positive refractive power; a second lens element with negative refractive power; a plastic third lens element, the object-side and image-side surfaces thereof being aspheric; and a plastic fourth lens element having a concave image-side surface, the object-side and image-side surfaces thereof being aspheric and at least one inflection point being formed on at least one of the object-side and image-side surfaces thereof, wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the object-side surface of the first lens element and the electronic sensor is TTL, and they satisfy the following relations: $0.35<Yc1/ImgH<0.95$; $1.80\text{ mm}<TTL<3.20\text{ mm}$.

Furthermore, the present invention provides an optical image-capturing lens assembly comprising, in order from an object side to an image side: a first lens element with positive refractive power having a convex object-side surface; a second lens element with negative refractive power; a plastic third lens element, the object-side and image-side surfaces thereof being aspheric; and a plastic fourth lens element having a concave image-side surface, the object-side and image-side surfaces thereof being aspheric and at least one inflection point being formed on at least one of the object-side and image-side surfaces thereof, wherein the assembly is further provided with an electronic sensor for image formation of an object, the electronic sensor is disposed at an image plane, a distance on the optical axis between the object-side surface of the first lens element and the electronic sensor is TTL, and they satisfy the following relation: $1.80\text{ mm}<TTL<3.20\text{ mm}$.

Such an arrangement of optical elements can effectively reduce the size of the lens assembly; meanwhile, for the image-capturing lens system, the field of view can be enlarged and higher resolution can be achieved.

In an optical image-capturing lens assembly of the present invention, the first lens element has positive refractive power, which provides part of the refractive power for the system and helps to reduce the total track length of the lens assembly. The second lens element has negative refractive power, which allows the aberrations produced by the first lens element with positive refractive power to be effectively corrected, as well as allows the chromatic aberrations of the system to be favorably corrected. The third lens element may have either negative or positive refractive power. When the third lens element has positive refractive power, the refractive power of the first lens element can be favorably distributed, thereby reducing the sensitivity of the system effectively; when the third lens element has negative refractive power, the Petzval Sum of the system can be corrected favorably and the peripheral image field becomes flatter. The fourth lens element may have either negative or positive refractive power. When the fourth lens element has positive refractive power, the high order aberrations of the system can be favorably corrected, thereby increasing the resolution of the lens assembly; when the fourth lens element has negative refractive power, the principal point of the optical system can be placed away from the image plane, thereby reducing the total track length of the system favorably and maintaining a compact lens assembly.

In an optical image-capturing lens assembly of the present invention, the first lens element may be a bi-convex lens element or a meniscus lens element having a convex object-side surface and a concave image-side surface. When the first lens element is a bi-convex lens element, the refractive power thereof can be favorably distributed, thereby reducing the total track length of the lens assembly; when the first lens element is a meniscus lens element, the astigmatism of the system can be corrected favorably. The second lens element has a concave image-side surface, which allows the back focal length of the system to be extended favorably, thereby providing sufficient space to accommodate other components in the lens assembly; preferably, the second lens element also has a concave object-side surface. The third lens element has a concave object-side surface and a convex image-side surface, which allows the astigmatism and high order aberrations of the system to be favorably corrected. The fourth lens element has a concave image-side surface, which allows the principal point of the optical system to be placed away from the image plane, thereby reducing the total track length of the system favorably and maintaining a compact lens assembly. When the fourth lens element has a convex object-side surface and a concave image-side surface, the astigmatism and high order aberrations of the system can also be corrected favorably; when the fourth lens element has concave object-side and image-side surfaces, the principal point of the optical system can be placed even farther from the image plane, thereby further reducing the total track length of the lens assembly.

In an optical image-capturing lens assembly of the present invention, the stop may be disposed between the object and the first lens element, or between the first lens element and the second lens element. With the first lens element providing positive refractive power and by placing the stop near the object side of the lens assembly, the total track length of the lens assembly can be reduced effectively. The aforementioned arrangement also enables the exit pupil of the lens assembly to be positioned far away from the image plane; thus, light will be projected onto the electronic sensor at a nearly perpendicular angle, and this is the telecentric feature of the image side. The telecentric feature is very important to the photosensitive ability of the current solid-state sensor as it can improve the photosensitivity of the sensor to reduce the probability of the occurrence of shading. Moreover, the fourth lens element is provided with an inflection point; as a result, the angle at which light is projected onto the sensor from the off-axis field can be effectively reduced, thereby further correcting the off-axis aberrations. In addition, when the stop is disposed closer to the second lens element, a wide field of view can be favorably achieved. Such an arrangement of the stop can facilitate the correction of distortion and chromatic aberration of magnification, as well as reduce the sensitivity of the system effectively. Therefore, in the present optical image-capturing lens assembly, when the stop is disposed between the object and the second lens element, it is for the purpose of achieving a good balance between the telecentric feature and a wide field of view of the lens assembly.

BRIEF DESCRIPTION OF THE DRAWINGS

FIG. 5A shows an optical image-capturing lens assembly in accordance with a fifth embodiment of the present invention.

FIG. 11 is TABLE 1 which lists the optical data of the first embodiment.

FIG. 12 is TABLE 2 which lists the aspheric surface data of the first embodiment.

FIG. 13 is TABLE 3 which lists the optical data of the second embodiment.

FIG. 14 is TABLE 4 which lists the aspheric surface data of the second embodiment.

FIG. 15 is TABLE 5 which lists the optical data of the third embodiment.

FIG. 16A is TABLE 6A and FIG. 16B is TABLE 6B, both listing the aspheric surface data of the third embodiment.

FIG. 17 is TABLE 7 which lists the optical data of the fourth embodiment.

FIG. 18 is TABLE 8 which lists the aspheric surface data of the fourth embodiment.

FIG. 19 is TABLE 9 which lists the optical data of the fifth embodiment.

FIG. 20A is TABLE 10A and FIG. 20B is TABLE 10B, both listing the aspheric surface data of the fifth embodiment.

FIG. 21 is TABLE 11 which lists the optical data of the sixth embodiment.

FIG. 22 is TABLE 12 which lists the aspheric surface data of the sixth embodiment.

FIG. 23 is TABLE 13 which lists the optical data of the seventh embodiment.

FIG. 24 is TABLE 14 which lists the aspheric surface data of the seventh embodiment.

FIG. 25 is TABLE 15 which lists the optical data of the eighth embodiment.

FIG. 26 is TABLE 16 which lists the aspheric surface data of the eighth embodiment.

FIG. 27 is TABLE 17 which lists the optical data of the ninth embodiment.

FIG. 28 is TABLE 18 which lists the aspheric surface data of the ninth embodiment.

FIG. 29 is TABLE 19 which lists the optical data of the tenth embodiment.

FIG. 30A is TABLE 20A and FIG. 30B is TABLE 20B, both listing the aspheric surface data of the tenth embodiment.

FIG. 31 is TABLE 21 which lists the data of the respective embodiments resulting from the equations.

DETAILED DESCRIPTION OF THE PREFERRED EMBODIMENTS

Figure 1A:
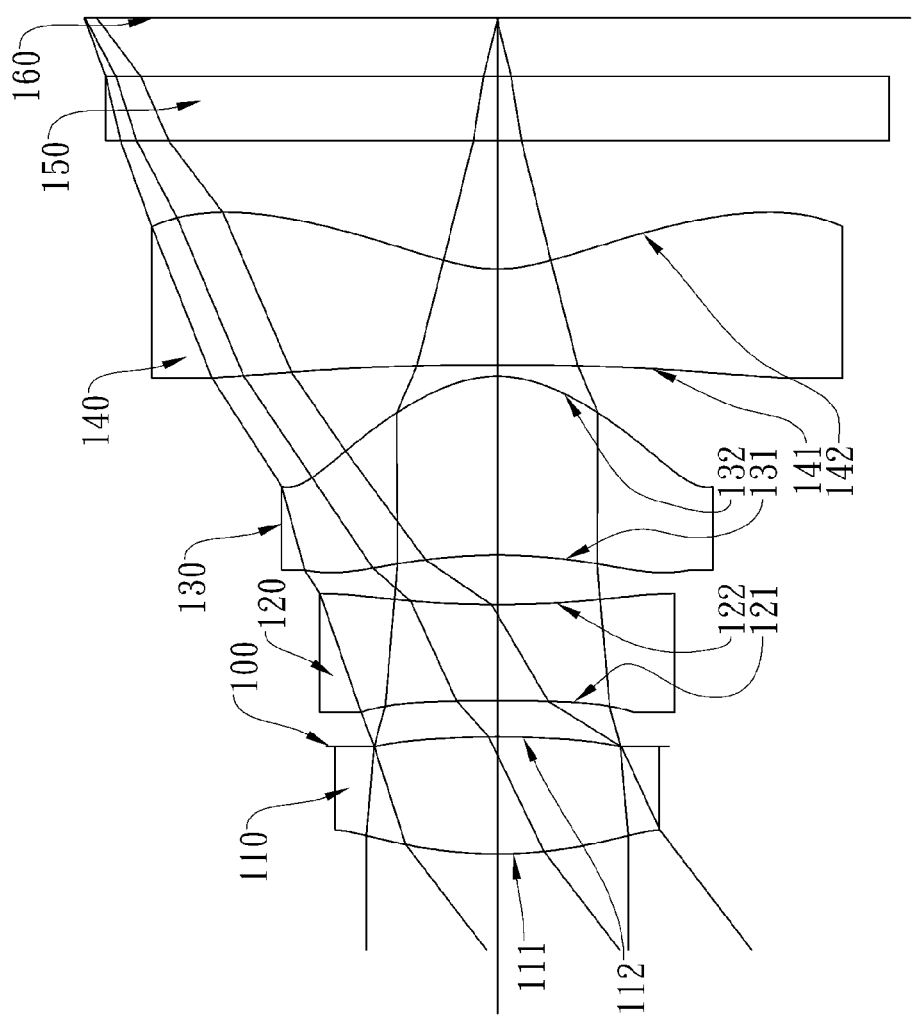
FIG. 1A shows an optical image-capturing lens assembly in accordance with a first embodiment of the present invention.

The present invention provides an optical image-capturing lens assembly comprising, in order from an object side to an image side: a first lens element with positive refractive power; a second lens element with negative refractive power; a third lens element, the object-side and image-side surfaces thereof being aspheric; and a fourth lens element having a concave image-side surface, the object-side and image-side surfaces thereof being aspheric and at least one inflection point being formed on at least one of the object-side and image-side surfaces thereof, wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the stop and the electronic sensor is SL, a distance on the optical axis between the object-side surface of the first lens element and the electronic sensor is TTL, and they satisfy the following relations: $0.35<Yc1/ImgH<0.95$; $0.70<SL/TTL<1.20$.

When the relation of $0.35<Yc1/ImgH<0.95$ is satisfied, a sufficient field of view can be achieved for the lens assembly, and the angle at which light is projected onto the sensor from the off-axis field can be effectively reduced, thereby further correcting the off-axis aberrations. When the relation of $0.70<SL/TTL<1.20$ is satisfied, a good balance between the telecentric feature and a wide field of view of the lens assembly can be favorably achieved.

In the aforementioned optical image-capturing lens assembly, preferably, the second lens element has a concave image-side surface, which allows the back focal length of the system to be extended favorably, thereby providing sufficient space to accommodate other components in the lens assembly; Further preferably, the second lens element also has a concave object-side surface. Preferably, the third lens element has a concave object-side surface and a convex image-side surface, which allows the astigmatism and high order aberrations of the system to be favorably corrected.

In the aforementioned optical image-capturing lens assembly, preferably, the third lens element has positive refractive power; as a result, the refractive power of the first lens element can be favorably distributed, thereby reducing the sensitivity of the system effectively. Preferably, the fourth lens element has negative refractive power, which allows the principal point of the optical system to be placed away from the image plane, thereby reducing the total track length of the system favorably and maintaining a compact lens assembly.

In the aforementioned optical image-capturing lens assembly, the focal length of the optical image-capturing lens assembly is f, the focal length of the third lens element is f3, the focal length of the first lens element is f1, and preferably, they satisfy the following relation: $0.70<(f/f3)-(f/f1)<2.00$. When this relation is satisfied, the refractive power of the system can be favorably distributed by the third lens element, so that the refractive power of a single lens element will not become too large; thus, the sensitivity of the system can be further reduced.

In the aforementioned optical image-capturing lens assembly, the thickness of the second lens element on the optical axis is CT2, and preferably, it satisfies the following relation: $0.15\ mm<CT2<0.32\ mm$. When this relation is satisfied, the thickness of the second lens element is more favorable. As a result, fewer manufacturing difficulties will be encountered during the lens production process, and the yield rate can be improved; also, plastic lens products will be formed more easily with a higher homogeneity during the injection molding process.

In the aforementioned optical image-capturing lens assembly, the Abbe number of the first lens element is V1, the Abbe number of the second lens element is V2, and preferably, they satisfy the following relation: $28.5<V1-V2<42.0$. When this relation is satisfied, the chromatic aberrations of the lens assembly can be favorably corrected.

In the aforementioned optical image-capturing lens assembly, the radius of curvature of the image-side surface of the fourth lens element is R8, the focal length of the optical image-capturing lens assembly is f, and preferably, they satisfy the following relation: $0.10<R8/f<0.45$. When this relation is satisfied, the principal point of the optical system can be placed away from the image plane, thereby reducing the total track length of the system favorably and maintaining a compact lens assembly.

In the aforementioned optical image-capturing lens assembly, a light ray having an incident angle of 37.2 degrees with respect to the optical axis and passing through the center of the stop intersects the image-side surface of the fourth lens element at a point, the perpendicular distance from the point to the optical axis is Yc2, half of the diagonal length of the effective pixel area of the electronic sensor is ImgH, and preferably, they satisfy the following relation: 0.50<Yc2/ImgH<0.95. When this relation is satisfied, a sufficient field of view can be achieved for the lens assembly, and the angle at which light is projected onto the sensor from the off-axis field can be effectively reduced, thereby further correcting the off-axis aberrations.

In the aforementioned optical image-capturing lens assembly, the distance on the optical axis between the object-side surface of the first lens element and the electronic sensor is TTL, and preferably, it satisfies the following relation: 1.80 mm<TTL<3.20 mm. When this relation is satisfied, aberrations of the system can also be corrected while the total track length of the lens assembly is reduced; thus, the lens assembly can be compact while keeping a good image quality. Further preferably, the following relation is satisfied: 2.20 mm<TTL<2.70 mm.

Moreover, the present invention provides an optical image-capturing lens assembly comprising, in order from an object side to an image side: a first lens element with positive refractive power; a second lens element with negative refractive power; a plastic third lens element, the object-side and image-side surfaces thereof being aspheric; and a plastic fourth lens element having a concave image-side surface, the object-side and image-side surfaces thereof being aspheric and at least one inflection point being formed on at least one of the object-side and image-side surfaces thereof, wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the object-side surface of the first lens element and the electronic sensor is TTL, and they satisfy the following relations: 0.35<Yc1/ImgH<0.95; 1.80 mm<TTL<3.20 mm.

When the relation of 0.35<Yc1/ImgH<0.95 is satisfied, a sufficient field of view can be achieved for the lens assembly, and the angle at which light is projected onto the sensor from the off-axis field can be effectively reduced, thereby further correcting the off-axis aberrations. When the relation of 1.80 mm<TTL<3.20 mm is satisfied, aberrations of the system can also be corrected while the total track length of the lens assembly is reduced; thus, the lens assembly can be compact while keeping a good image quality. Further preferably, the following relation is satisfied: 2.20 mm<TTL<2.70 mm.

In the aforementioned optical image-capturing lens assembly, preferably, the third lens element has positive refractive power; as a result, the refractive power of the first lens element can be favorably distributed, thereby reducing the sensitivity of the system effectively. Preferably, the fourth lens element has negative refractive power, which allows the principal point of the optical system to be placed away from the image plane, thereby reducing the total track length of the system favorably and maintaining a compact lens assembly.

In the aforementioned optical image-capturing lens assembly, preferably, the first lens element has a convex object-side surface. When the first lens element is a bi-convex lens element, the refractive power thereof can be favorably distributed, thereby further reducing the total track length of the lens assembly; when the first lens element is a meniscus lens element, the astigmatism of the system can be corrected favorably. Preferably, the second lens element has a concave image-side surface, which allows the back focal length of the system to be extended favorably, thereby providing sufficient space to accommodate other components in the lens assembly; further preferably, the second lens element also has a concave object-side surface. In the aforementioned optical image-capturing lens assembly, preferably, the third lens element has a concave object-side surface and a convex image-side surface, which allows the astigmatism and high order aberrations of the system to be favorably corrected. Preferably, the fourth lens element has a concave image-side surface, which allows the principal point of the optical system to be placed away from the image plane, thereby reducing the total track length of the system favorably and maintaining a compact lens assembly; further preferably, the fourth lens element has a concave object-side surface.

In the aforementioned optical image-capturing lens assembly, the focal length of the optical image-capturing lens assembly is f, the focal length of the third lens element is f3, the focal length of the first lens element is f1, and preferably, they satisfy the following relation: 0.70<(f/f3)−(f/f1)<2.00. When this relation is satisfied, the refractive power of the system can be favorably distributed by the third lens element, so that the refractive power of a single lens element will not become too large; thus, the sensitivity of the system can be further reduced.

In the aforementioned optical image-capturing lens assembly, the Abbe number of the first lens element is V1, the Abbe number of the second lens element is V2, and preferably, they satisfy the following relation: 28.5<V1−V2<42.0. When this relation is satisfied, the chromatic aberrations of the lens assembly can be favorably corrected.

In the aforementioned optical image-capturing lens assembly, half of the diagonal length of the effective pixel area of the electronic sensor is ImgH, the distance on the optical axis between the object-side surface of the first lens element and the electronic sensor is TTL, the thickness of the second lens element on the optical axis is CT2, and preferably, they satisfy the following relation: $2.50 < TTL/(ImgH \times CT2)^{1/2} < 4.35$. When this relation is satisfied, the lens assembly can maintain a compact size, so that it can be favorably installed into a compact, portable electronic product.

Furthermore, the present invention provides an optical image-capturing lens assembly comprising, in order from an object side to an image side: a first lens element with positive refractive power having a convex object-side surface; a second lens element with negative refractive power; a plastic third lens element, the object-side and image-side surfaces thereof being aspheric; and a plastic fourth lens element having a concave image-side surface, the object-side and image-side surfaces thereof being aspheric and at least one inflection point being formed on at least one of the object-side and image-side surfaces thereof, wherein the assembly is further provided with an electronic sensor for image formation of an object, the electronic sensor is disposed at an image plane, a distance on the optical axis between the object-side surface of the first lens element and the electronic sensor is TTL, and they satisfy the following relation: 1.80 mm<TTL<3.20 mm.

When the relation of 1.80 mm<TTL<3.20 mm is satisfied, aberrations of the system can also be corrected while the total track length of the lens assembly is reduced; thus, the lens assembly can be compact while keeping a good image quality. Further preferably, the following relation is satisfied: 2.20 mm<TTL<2.70 mm.

In the aforementioned optical image-capturing lens assembly, preferably, the second lens element has a concave image-side surface, which allows the back focal length of the system to be extended favorably, thereby providing sufficient space to accommodate other components in the lens assembly; further preferably, the second lens element also has a concave object-side surface. In the aforementioned optical image-capturing lens assembly, preferably, the third lens element has a concave object-side surface and a convex image-side surface, which allows the astigmatism and high order aberrations of the system to be favorably corrected.

In the aforementioned optical image-capturing lens assembly, preferably, the third lens element has positive refractive power; as a result, the refractive power of the first lens element can be favorably distributed, thereby reducing the sensitivity of the system effectively. Preferably, the fourth lens element has negative refractive power, which allows the principal point of the optical system to be placed away from the image plane, thereby reducing the total track length of the system favorably and maintaining a compact lens assembly.

In the aforementioned optical image-capturing lens assembly, the focal length of the optical image-capturing lens assembly is f, the focal length of the third lens element is f3, the focal length of the first lens element is f1, and preferably, they satisfy the following relation: 0.70<(f/f3)−(f/f1)<2.00. When this relation is satisfied, the refractive power of the system can be favorably distributed by the third lens element, so that the refractive power of a single lens element will not become too large; thus, the sensitivity of the system can be further reduced.

In the aforementioned optical image-capturing lens assembly, the Abbe number of the first lens element is V1, the Abbe number of the second lens element is V2, and preferably, they satisfy the following relation: 28.5<V1−V2<42.0. When this relation is satisfied, the chromatic aberrations of the lens assembly can be favorably corrected.

In the aforementioned optical image-capturing lens assembly, a light ray having an incident angle of 36.5 degrees with respect to the optical axis and passing through the center of the stop intersects the image-side surface of the fourth lens element at a point, the perpendicular distance from the point to the optical axis is Yc1, half of the diagonal length of the effective pixel area of the electronic sensor is ImgH, and preferably, they satisfy the following relation: 0.35<Yc1/ImgH<0.95. When this relation is satisfied, a sufficient field of view can be achieved for the lens assembly, and the angle at which light is projected onto the sensor from the off-axis field can be effectively reduced, thereby further correcting the off-axis aberrations.

In the aforementioned optical image-capturing lens assembly, half of the diagonal length of the effective pixel area of the electronic sensor is ImgH, the distance on the optical axis between the object-side surface of the first lens element and the electronic sensor is TTL, the thickness of the second lens element on the optical axis is CT2, and preferably, they satisfy the following relation: $2.50<TTL/(ImgH \times CT2)^{1/2}<4.35$. When this relation is satisfied, the lens assembly can maintain a compact size, so that it can be favorably installed into a compact, portable electronic product.

In an optical image-capturing lens assembly of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the image capturing system can be reduced effectively.

In an optical image-capturing lens assembly of the present invention, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
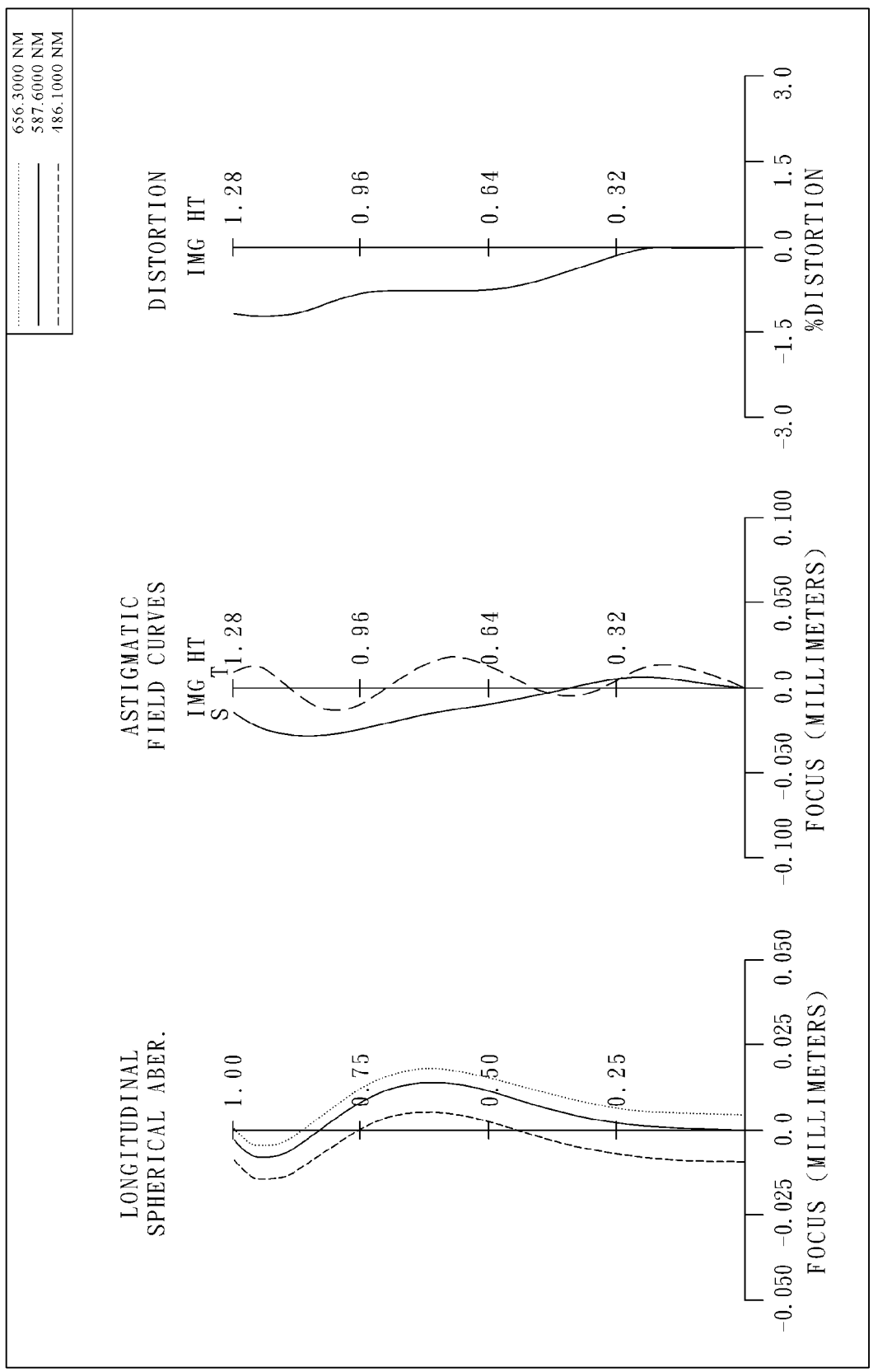
FIG. 1B shows the aberration curves of the first embodiment of the present invention.

FIG. 1A shows an optical image-capturing lens assembly in accordance with a first embodiment of the present invention, and FIG. 1B shows the aberration curves of the first embodiment of the present invention. The optical image-capturing lens assembly in the first embodiment mainly comprises four lens elements, in order from an object side to an image side: a plastic first lens element 110 with positive refractive power having a convex object-side surface 111 and a convex image-side surface 112, both of the surfaces 111 and 112 being aspheric; a plastic second lens element 120 with negative refractive power having a concave object-side surface 121 and a concave image-side surface 122, both of the surfaces 121 and 122 being aspheric; a plastic third lens element 130 with positive refractive power having a concave object-side surface 131 and a convex image-side surface 132, both of the surfaces 131 and 132 being aspheric; a plastic fourth lens element 140 with negative refractive power having a concave object-side surface 141 and a concave image-side surface 142, both of the surfaces 141 and 142 being aspheric and at least one inflection point being formed on at least one of the surfaces 141 and 142. Moreover, the optical image-capturing lens assembly is provided with a stop 100 disposed between the first lens element 110 and the second lens element 120. The optical image-capturing lens assembly further comprises an IR filter 150 disposed between the image-side surface 142 of the fourth lens element 140 and an image plane 160; the IR filter 150 is made of glass and has no influence on the focal length of the image-capturing lens assembly.

The equation of the aspheric surface profiles is expressed as follows:

$$X(Y) = (Y^2/R) / \left(1 + sqrt(1 - (1+k)*(Y/R)^2)\right) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical image-capturing lens assembly, the focal length of the assembly is f, and it satisfies the relation: f=1.70 (mm).

In the first embodiment of the present optical image-capturing lens assembly, the f-number of the assembly is Fno, and it satisfies the relation: Fno=2.08.

In the first embodiment of the present optical image-capturing lens assembly, half of the maximum field of view of the assembly is HFOV, and it satisfies the relation: HFOV=37.4 (degrees).

In the first embodiment of the present optical image-capturing lens assembly, the Abbe number of the first lens element 110 is V1, the Abbe number of the second lens element 120 is V2, and they satisfy the relation: V1−V2=32.5.

In the first embodiment of the present optical image-capturing lens assembly, the radius of curvature of the image-side surface 142 of the fourth lens element 140 is R8, the focal length of the assembly is f, and they satisfy the relation: R8/f=0.26.

In the first embodiment of the present optical image-capturing lens assembly, the focal length of the assembly is f, the focal length of the third lens element 130 is f3, the focal length of the first lens element 110 is f1, and they satisfy the relation: (f/f3)−(f/f1)=1.47.

In the first embodiment of the present optical image-capturing lens assembly, the thickness of the second lens element 120 on the optical axis is CT2, and it satisfies the relation: CT2=0.300 (mm).

In the first embodiment of the present optical image-capturing lens assembly, it is further provided with an electronic sensor disposed at the image plane 160 for image formation of an object, the distance on the optical axis between the object-side surface 111 of the first lens element 110 and the electronic sensor is TTL, and it satisfies the relation: TTL=2.54 (mm).

In the first embodiment of the present optical image-capturing lens assembly, half of the diagonal length of the effective pixel area of the electronic sensor is ImgH, the distance on the optical axis between the object-side surface 111 of the first lens element 110 and the electronic sensor is TTL, the thickness of the second lens element 120 on the optical axis is CT2, and they satisfy the relation: $TTL/(ImgH \times CT2)^{1/2}$=4.09.

In the first embodiment of the present optical image-capturing lens assembly, the distance on the optical axis between the stop 100 and the electronic sensor is SL, the distance on the optical axis between the object-side surface 111 of the first lens element 110 and the electronic sensor is TTL, and they satisfy the relation: SL/TTL=0.87.

In the first embodiment of the present optical image-capturing lens assembly, a light ray having an incident angle of 36.5 degrees with respect to the optical axis and passing through the center of the stop 100 intersects the image-side surface 142 of the fourth lens element 140 at a point, the perpendicular distance from the point to the optical axis is Yc1, half of the diagonal length of the effective pixel area of the electronic sensor is ImgH, and they satisfy the relation: Yc1/ImgH=0.75.

In the first embodiment of the present optical image-capturing lens assembly, a light ray having an incident angle of 37.2 degrees with respect to the optical axis and passing through the center of the stop 100 intersects the image-side surface 142 of the fourth lens element 140 at a point, the perpendicular distance from the point to the optical axis is Yc2, half of the diagonal length of the effective pixel area of the electronic sensor is ImgH, and they satisfy the following relation: Yc2/ImgH=0.77.

The detailed optical data of the first embodiment is shown in FIG. 11 (TABLE 1), and the aspheric surface data is shown in FIG. 12 (TABLE 2), wherein the units of the radius of curvature, the thickness and the focal length are expressed in mm, and HFOV is half of the maximum field of view.

Figure 2A:
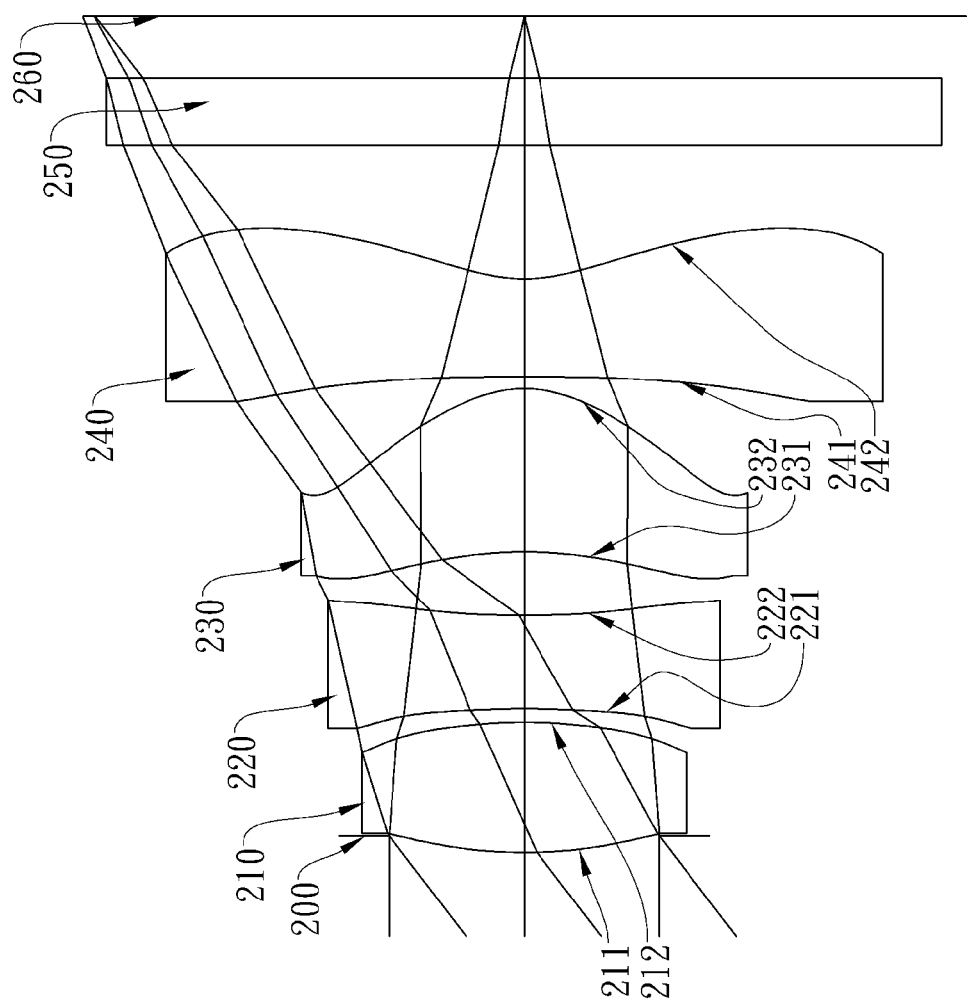
FIG. 2A shows an optical image-capturing lens assembly in accordance with a second embodiment of the present invention.
Figure 2B:
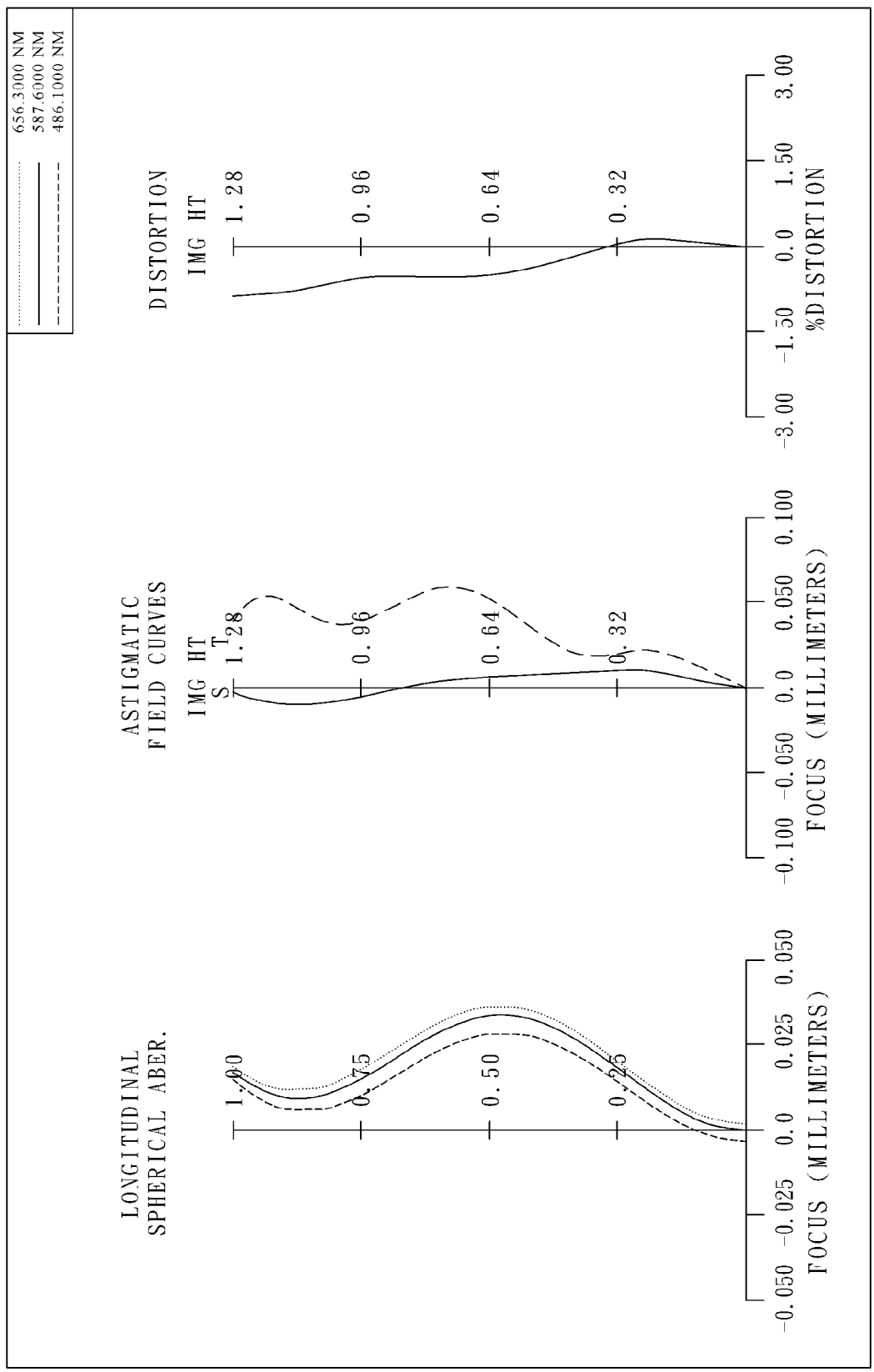
FIG. 2B shows the aberration curves of the second embodiment of the present invention.

FIG. 2A shows an optical image-capturing lens assembly in accordance with a second embodiment of the present invention, and FIG. 2B shows the aberration curves of the second embodiment of the present invention. The optical image-capturing lens assembly in the second embodiment mainly comprises four lens elements, in order from an object side to an image side: a plastic first lens element 210 with positive refractive power having a convex object-side surface 211 and a convex image-side surface 212, both of the surfaces 211 and 212 being aspheric; a plastic second lens element 220 with negative refractive power having a concave object-side surface 221 and a concave image-side surface 222, both of the surfaces 221 and 222 being aspheric; a plastic third lens element 230 with positive refractive power having a concave object-side surface 231 and a convex image-side surface 232, both of the surfaces 231 and 232 being aspheric; a plastic fourth lens element 240 with negative refractive power having a concave object-side surface 241 and a concave image-side surface 242, both of the surfaces 241 and 242 being aspheric and at least one inflection point being formed on at least one of the surfaces 241 and 242. Moreover, the optical image-capturing lens assembly is provided with a stop 200 disposed between the object and the object-side surface 211 of the first lens element 210. The optical image-capturing lens assembly further comprises an IR filter 250 disposed between the image-side surface 242 of the fourth lens element 240 and an image plane 260; the IR filter 250 is made of glass and has no influence on the focal length of the image-capturing lens assembly.

The equation of the aspheric surface profiles of the second embodiment has the same form as that of the first embodiment.

In the second embodiment of the present optical image-capturing lens assembly, the focal length of the assembly is f, and it satisfies the relation: f=1.70 (mm).

In the second embodiment of the present optical image-capturing lens assembly, the f-number of the assembly is Fno, and it satisfies the relation: Fno=2.08.

In the second embodiment of the present optical image-capturing lens assembly, half of the maximum field of view of the assembly is HFOV, and it satisfies the relation: HFOV=37.5 (degrees).

In the second embodiment of the present optical image-capturing lens assembly, the Abbe number of the first lens element 210 is V1, the Abbe number of the second lens element 220 is V2, and they satisfy the relation: V1−V2=32.5.

In the second embodiment of the present optical image-capturing lens assembly, the radius of curvature of the image-side surface 242 of the fourth lens element 240 is R8, the focal length of the assembly is f, and they satisfy the relation: R8/f=0.26.

In the second embodiment of the present optical image-capturing lens assembly, the focal length of the assembly is f, the focal length of the third lens element 230 is f3, the focal length of the first lens element 210 is f1, and they satisfy the relation: (f/f3)−(f/f1)=1.00.

In the second embodiment of the present optical image-capturing lens assembly, the thickness of the second lens element 220 on the optical axis is CT2, and it satisfies the relation: CT2=0.280 (mm).

In the second embodiment of the present optical image-capturing lens assembly, it is further provided with an electronic sensor disposed at the image plane 260 for image formation of an object, the distance on the optical axis between the object-side surface 211 of the first lens element 210 and the electronic sensor is TTL, and it satisfies the relation: TTL=2.43 (mm).

In the second embodiment of the present optical image-capturing lens assembly, half of the diagonal length of the effective pixel area of the electronic sensor is ImgH, the distance on the optical axis between the object-side surface 211 of the first lens element 210 and the electronic sensor is TTL, the thickness of the second lens element 220 on the optical axis is CT2, and they satisfy the relation: $TTL/(ImgH \times CT2)^{1/2}$=4.05.

In the second embodiment of the present optical image-capturing lens assembly, the distance on the optical axis between the stop 200 and the electronic sensor is SL, the distance on the optical axis between the object-side surface 211 of the first lens element 210 and the electronic sensor is TTL, and they satisfy the relation: SL/TTL=0.98.

In the second embodiment of the present optical image-capturing lens assembly, a light ray having an incident angle of 36.5 degrees with respect to the optical axis and passing through the center of the stop 200 intersects the image-side surface 242 of the fourth lens element 240 at a point, the perpendicular distance from the point to the optical axis is Yc1, half of the diagonal length of the effective pixel area of the electronic sensor is ImgH, and they satisfy the relation: Yc1/ImgH=0.72.

In the second embodiment of the present optical image-capturing lens assembly, a light ray having an incident angle of 37.2 degrees with respect to the optical axis and passing through the center of the stop 200 intersects the image-side surface 242 of the fourth lens element 240 at a point, the perpendicular distance from the point to the optical axis is Yc2, half of the diagonal length of the effective pixel area of the electronic sensor is ImgH, and they satisfy the following relation: Yc2/ImgH=0.75.

The detailed optical data of the second embodiment is shown in FIG. 13 (TABLE 3), and the aspheric surface data is shown in FIG. 14 (TABLE 4), wherein the units of the radius of curvature, the thickness and the focal length are expressed in mm, and HFOV is half of the maximum field of view.

Figure 3A:
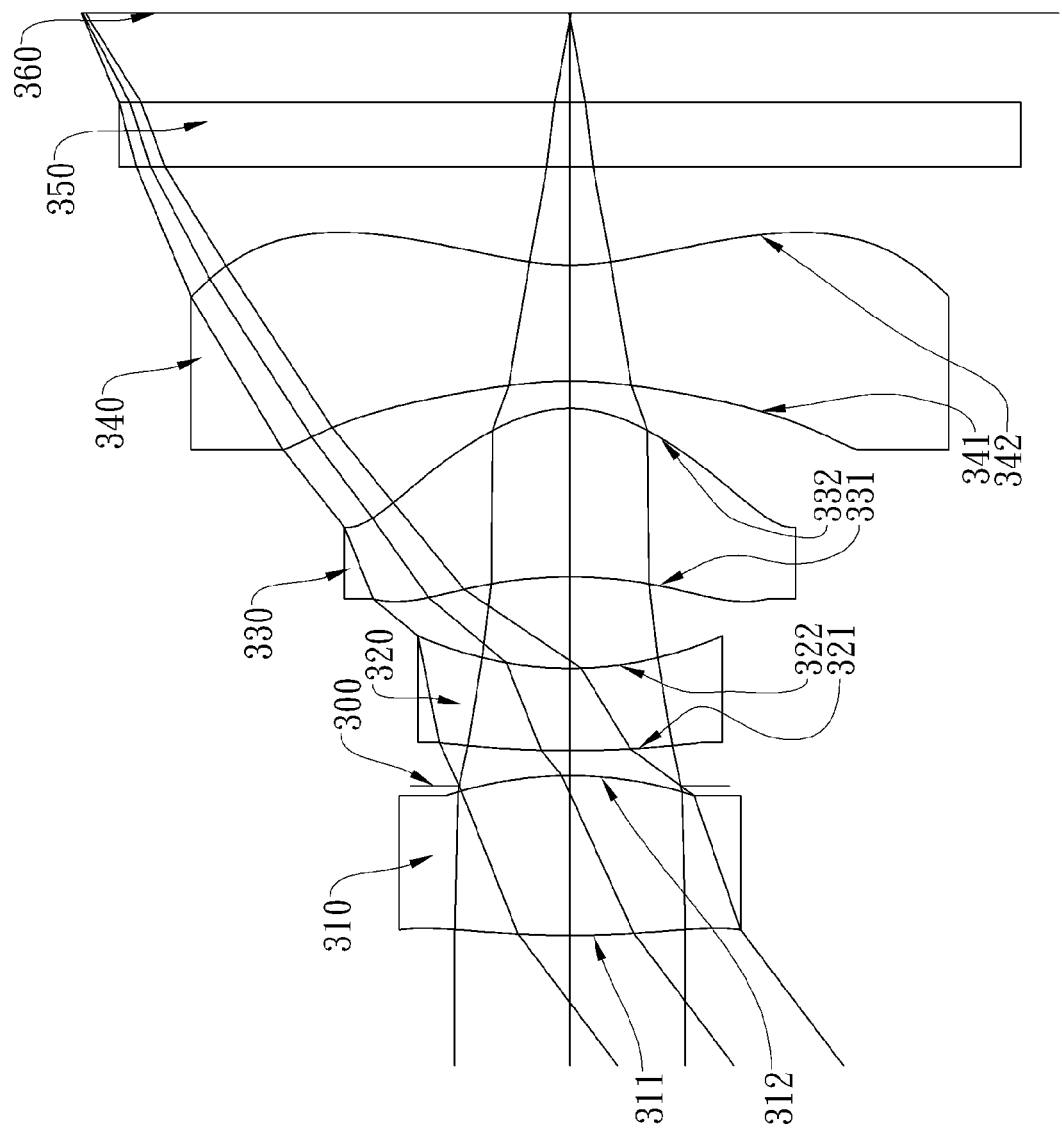
FIG. 3A shows an optical image-capturing lens assembly in accordance with a third embodiment of the present invention.
Figure 3B:
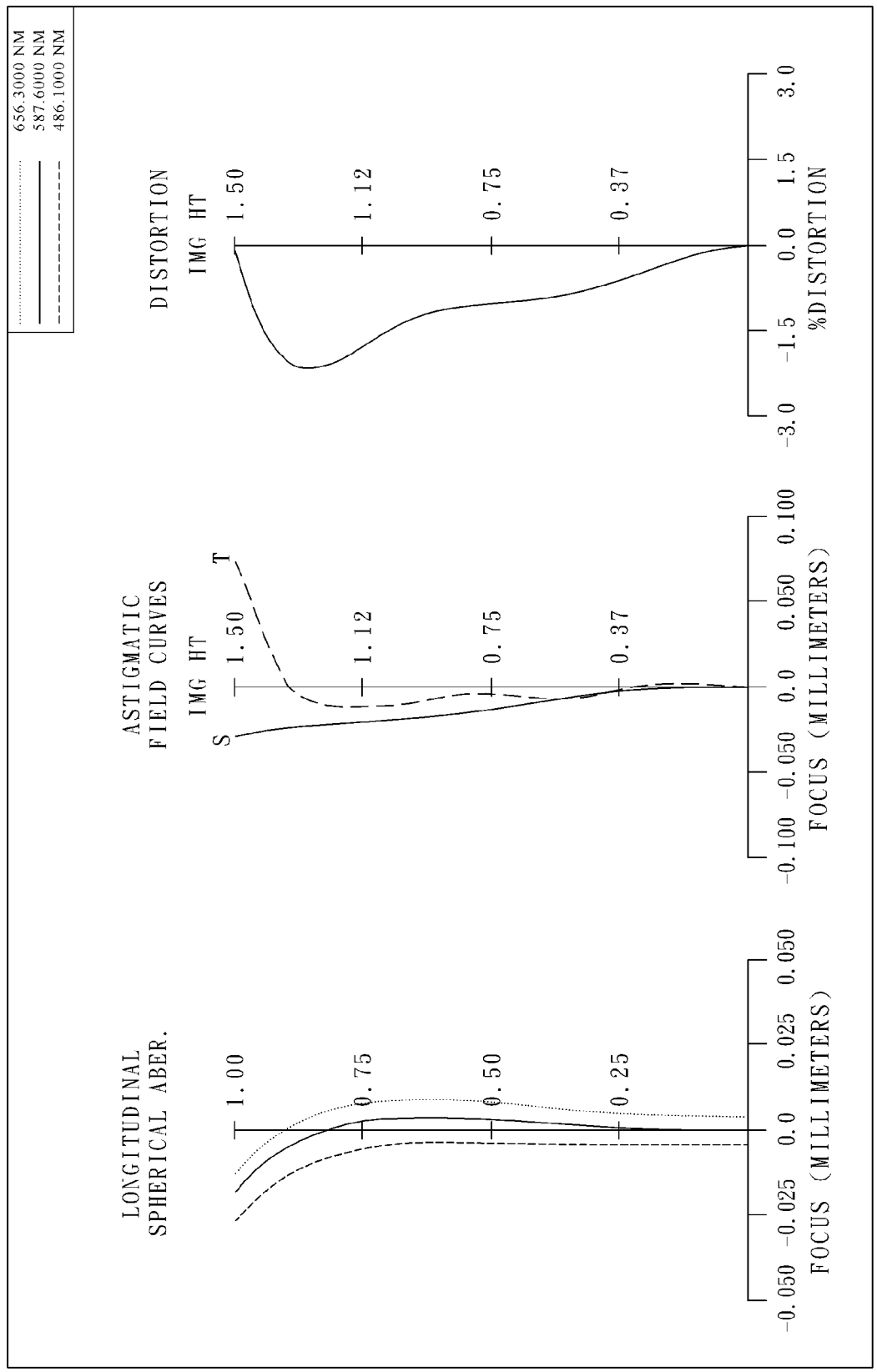
FIG. 3B shows the aberration curves of the third embodiment of the present invention.

FIG. 3A shows an optical image-capturing lens assembly in accordance with a third embodiment of the present invention, and FIG. 3B shows the aberration curves of the third embodiment of the present invention. The optical image-capturing lens assembly in the third embodiment mainly comprises four lens elements, in order from an object side to an image side: a plastic first lens element 310 with positive refractive power having a convex object-side surface 311 and a convex image-side surface 312, both of the surfaces 311 and 312 being aspheric; a plastic second lens element 320 with negative refractive power having a convex object-side surface 321 and a concave image-side surface 322, both of the surfaces 321 and 322 being aspheric; a plastic third lens element 330 with positive refractive power having a concave object-side surface 331 and a convex image-side surface 332, both of the surfaces 331 and 332 being aspheric; a plastic fourth lens element 340 with negative refractive power having a concave object-side surface 341 and a concave image-side surface 342, both of the surfaces 341 and 342 being aspheric and at least one inflection point being formed on at least one of the surfaces 341 and 342. Moreover, the optical image-capturing lens assembly is provided with a stop 300 disposed between the first lens element 310 and the second lens element 320. The optical image-capturing lens assembly further comprises an IR filter 350 disposed between the image-side surface 342 of the fourth lens element 340 and an image plane 360; the IR filter 350 is made of glass and has no influence on the focal length of the image-capturing lens assembly.

The equation of the aspheric surface profiles of the third embodiment has the same form as that of the first embodiment.

In the third embodiment of the present optical image-capturing lens assembly, the focal length of the assembly is f, and it satisfies the relation: f=1.99 (mm).

In the third embodiment of the present optical image-capturing lens assembly, the f-number of the assembly is Fno, and it satisfies the relation: Fno=2.80.

In the third embodiment of the present optical image-capturing lens assembly, half of the maximum field of view of the assembly is HFOV, and it satisfies the relation: HFOV=37.1 (degrees).

In the third embodiment of the present optical image-capturing lens assembly, the Abbe number of the first lens element 310 is V1, the Abbe number of the second lens element 320 is V2, and they satisfy the relation: V1−V2=34.5.

In the third embodiment of the present optical image-capturing lens assembly, the radius of curvature of the image-side surface 342 of the fourth lens element 340 is R8, the focal length of the assembly is f, and they satisfy the relation: R8/f=0.37.

In the third embodiment of the present optical image-capturing lens assembly, the focal length of the assembly is f, the focal length of the third lens element 330 is f3, the focal length of the first lens element 310 is f1, and they satisfy the relation: (f/f3)−(f/f1)=1.24.

In the third embodiment of the present optical image-capturing lens assembly, the thickness of the second lens element 320 on the optical axis is CT2, and it satisfies the relation: CT2=0.254 (mm).

In the third embodiment of the present optical image-capturing lens assembly, it is further provided with an electronic sensor disposed at the image plane 360 for image formation of an object, the distance on the optical axis between the object-side surface 311 of the first lens element 310 and the electronic sensor is TTL, and it satisfies the relation: TTL=2.77 (mm).

In the third embodiment of the present optical image-capturing lens assembly, half of the diagonal length of the effective pixel area of the electronic sensor is ImgH, the distance on the optical axis between the object-side surface 311 of the first lens element 310 and the electronic sensor is TTL, the thickness of the second lens element 320 on the optical axis is CT2, and they satisfy the relation: $TTL/(ImgH \times CT2)^{1/2}$=4.49.

In the third embodiment of the present optical image-capturing lens assembly, the distance on the optical axis between the stop 300 and the electronic sensor is SL, the distance on the optical axis between the object-side surface 311 of the first lens element 310 and the electronic sensor is TTL, and they satisfy the relation: SL/TTL=0.83.

In the third embodiment of the present optical image-capturing lens assembly, a light ray having an incident angle of 36.5 degrees with respect to the optical axis and passing through the center of the stop 300 intersects the image-side surface 342 of the fourth lens element 340 at a point, the perpendicular distance from the point to the optical axis is Yc1, half of the diagonal length of the effective pixel area of the electronic sensor is ImgH, and they satisfy the relation: Yc1/ImgH=0.72.

The detailed optical data of the third embodiment is shown in FIG. 15 (TABLE 5), and the aspheric surface data is shown in FIG. 16A (TABLE 6A) and FIG. 16B (TABLE 6B), wherein the units of the radius of curvature, the thickness and the focal length are expressed in mm, and HFOV is half of the maximum field of view.

Figure 4A:
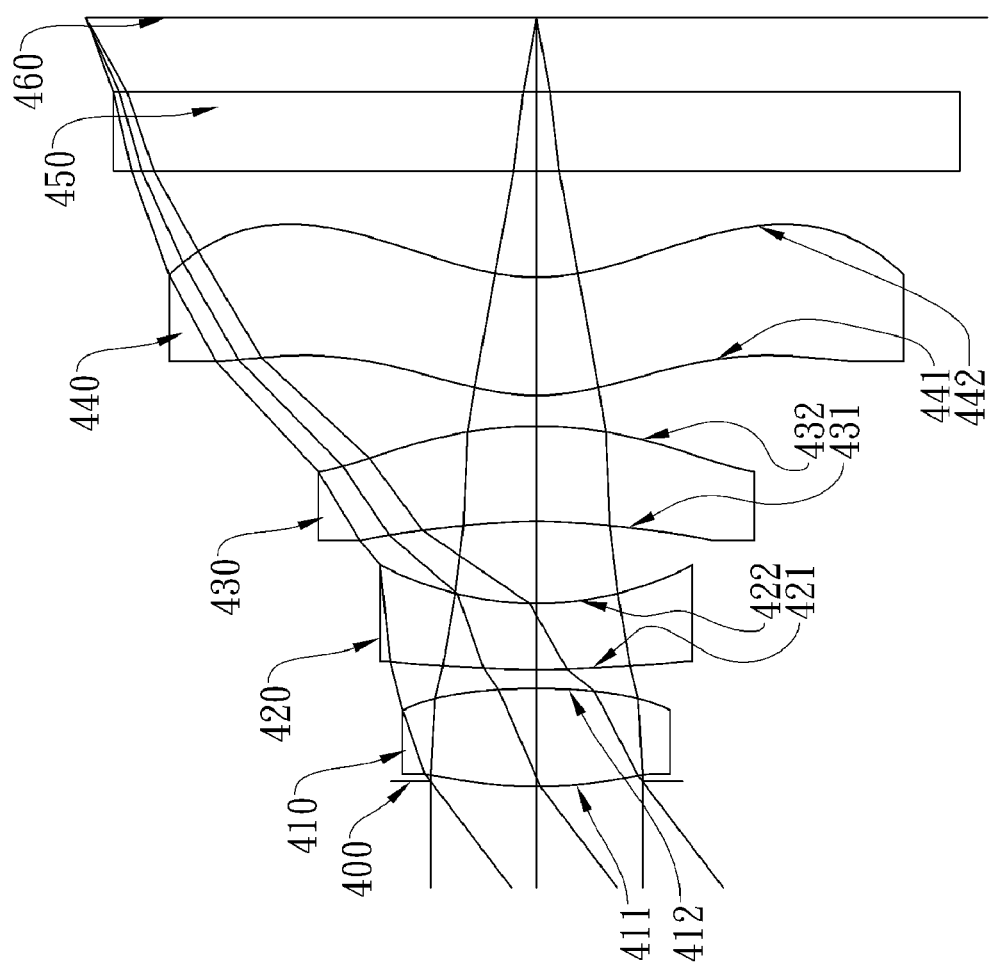
FIG. 4A shows an optical image-capturing lens assembly in accordance with a fourth embodiment of the present invention.
Figure 4B:
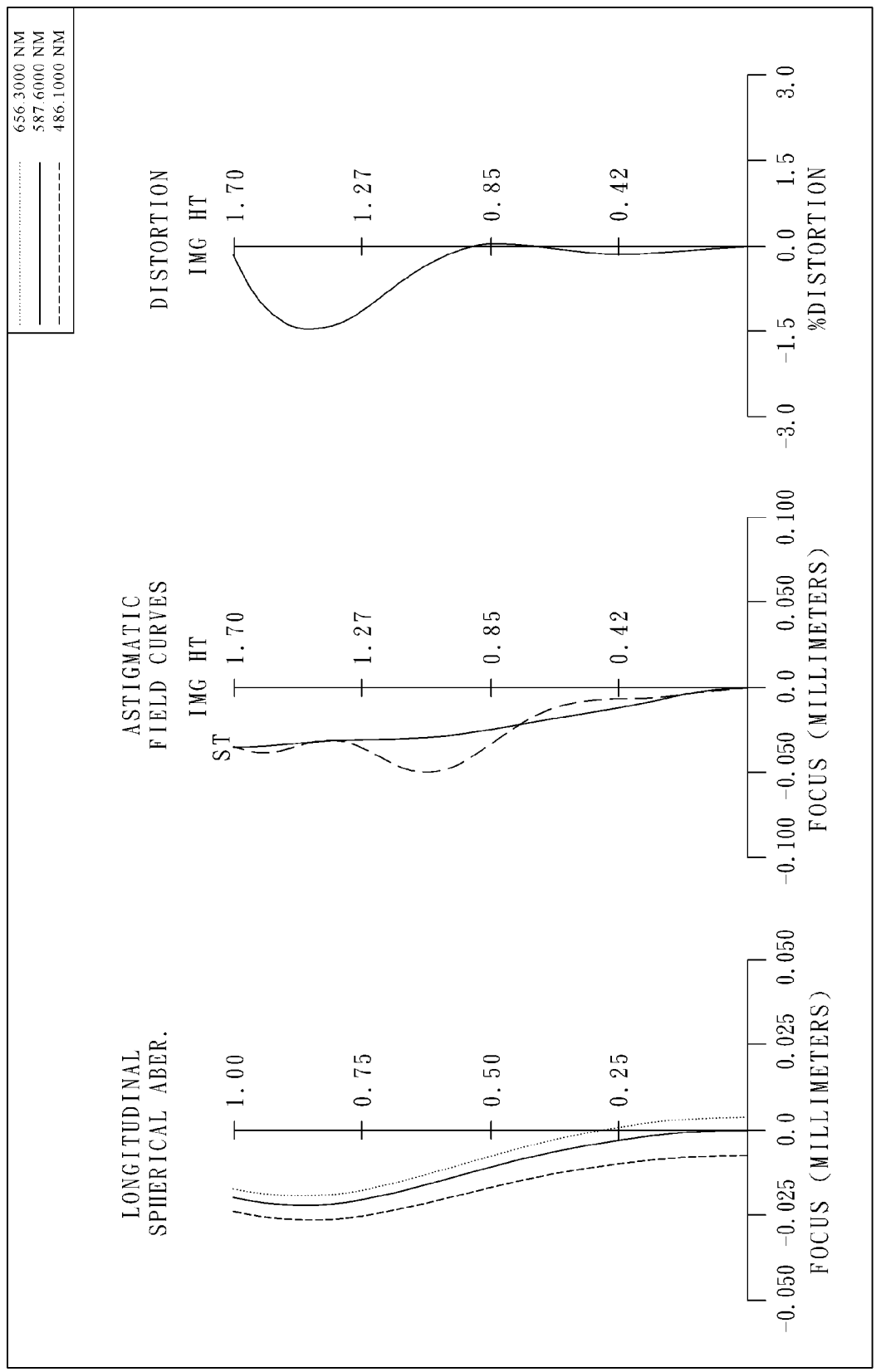
FIG. 4B shows the aberration curves of the fourth embodiment of the present invention.

FIG. 4A shows an optical image-capturing lens assembly in accordance with a fourth embodiment of the present invention, and FIG. 4B shows the aberration curves of the fourth embodiment of the present invention. The optical image-capturing lens assembly in the fourth embodiment mainly comprises four lens elements, in order from an object side to an image side: a plastic first lens element 410 with positive refractive power having a convex object-side surface 411 and a convex image-side surface 412, both of the surfaces 411 and 412 being aspheric; a plastic second lens element 420 with negative refractive power having a convex object-side surface 421 and a concave image-side surface 422, both of the surfaces 421 and 422 being aspheric; a plastic third lens element 430 with positive refractive power having a concave object-side surface 431 and a convex image-side surface 432, both of the surfaces 431 and 432 being aspheric; a plastic fourth lens element 440 with positive refractive power having a convex object-side surface 441 and a concave image-side surface 442, both of the surfaces 441 and 442 being aspheric and at least one inflection point being formed on at least one of the surfaces 441 and 442. Moreover, the optical image-capturing lens assembly is provided with a stop 400 disposed between the object and the first lens element 410. The optical image-capturing lens assembly further comprises an IR filter 450 disposed between the image-side surface 442 of the fourth lens element 440 and an image plane 460; the IR filter 450 is made of glass and has no influence on the focal length of the image-capturing lens assembly.

The equation of the aspheric surface profiles of the fourth embodiment has the same form as that of the first embodiment.

In the fourth embodiment of the present optical image-capturing lens assembly, the focal length of the assembly is f, and it satisfies the relation: f=2.23 (mm).

In the fourth embodiment of the present optical image-capturing lens assembly, the f-number of the assembly is Fno, and it satisfies the relation: Fno=2.82.

In the fourth embodiment of the present optical image-capturing lens assembly, half of the maximum field of view of the assembly is HFOV, and it satisfies the relation: HFOV=37.2 (degrees).

In the fourth embodiment of the present optical image-capturing lens assembly, the Abbe number of the first lens element 410 is V1, the Abbe number of the second lens element 420 is V2, and they satisfy the relation: V1−V2=32.5.

In the fourth embodiment of the present optical image-capturing lens assembly, the radius of curvature of the image-side surface 442 of the fourth lens element 440 is R8, the focal length of the assembly is f, and they satisfy the relation: R8/f=0.36.

In the fourth embodiment of the present optical image-capturing lens assembly, the focal length of the assembly is f, the focal length of the third lens element 430 is f3, the focal length of the first lens element 410 is f1, and they satisfy the relation: (f/f3)−(f/f1)=−1.07.

In the fourth embodiment of the present optical image-capturing lens assembly, the thickness of the second lens element 420 on the optical axis is CT2, and it satisfies the relation: CT2=0.250 (mm).

In the fourth embodiment of the present optical image-capturing lens assembly, it is further provided with an electronic sensor disposed at the image plane 460 for image formation of an object, the distance on the optical axis between the object-side surface 411 of the first lens element 410 and the electronic sensor is TTL, and it satisfies the relation: TTL=2.80 (mm).

In the fourth embodiment of the present optical image-capturing lens assembly, half of the diagonal length of the effective pixel area of the electronic sensor is ImgH, the distance on the optical axis between the object-side surface 411 of the first lens element 410 and the electronic sensor is TTL, the thickness of the second lens element 420 on the optical axis is CT2, and they satisfy the relation: TTL/(ImgH× CT2)$^{1/2}$=4.30.

In the fourth embodiment of the present optical image-capturing lens assembly, the distance on the optical axis between the stop 400 and the electronic sensor is SL, the distance on the optical axis between the object-side surface 411 of the first lens element 410 and the electronic sensor is TTL, and they satisfy the relation: SL/TTL=0.99.

In the fourth embodiment of the present optical image-capturing lens assembly, a light ray having an incident angle of 36.5 degrees with respect to the optical axis and passing through the center of the stop 400 intersects the image-side surface 442 of the fourth lens element 440 at a point, the perpendicular distance from the point to the optical axis is Yc1, half of the diagonal length of the effective pixel area of the electronic sensor is ImgH, and they satisfy the relation: Yc1/ImgH=0.76.

In the fourth embodiment of the present optical image-capturing lens assembly, a light ray having an incident angle of 37.2 degrees with respect to the optical axis and passing through the center of the stop 400 intersects the image-side surface 442 of the fourth lens element 440 at a point, the perpendicular distance from the point to the optical axis is Yc2, half of the diagonal length of the effective pixel area of the electronic sensor is ImgH, and they satisfy the following relation: Yc2/ImgH=0.78.

The detailed optical data of the fourth embodiment is shown in FIG. 17 (TABLE 7), and the aspheric surface data is shown in FIG. 18 (TABLE 8), wherein the units of the radius of curvature, the thickness and the focal length are expressed in mm, and HFOV is half of the maximum field of view.

Figure 5B:
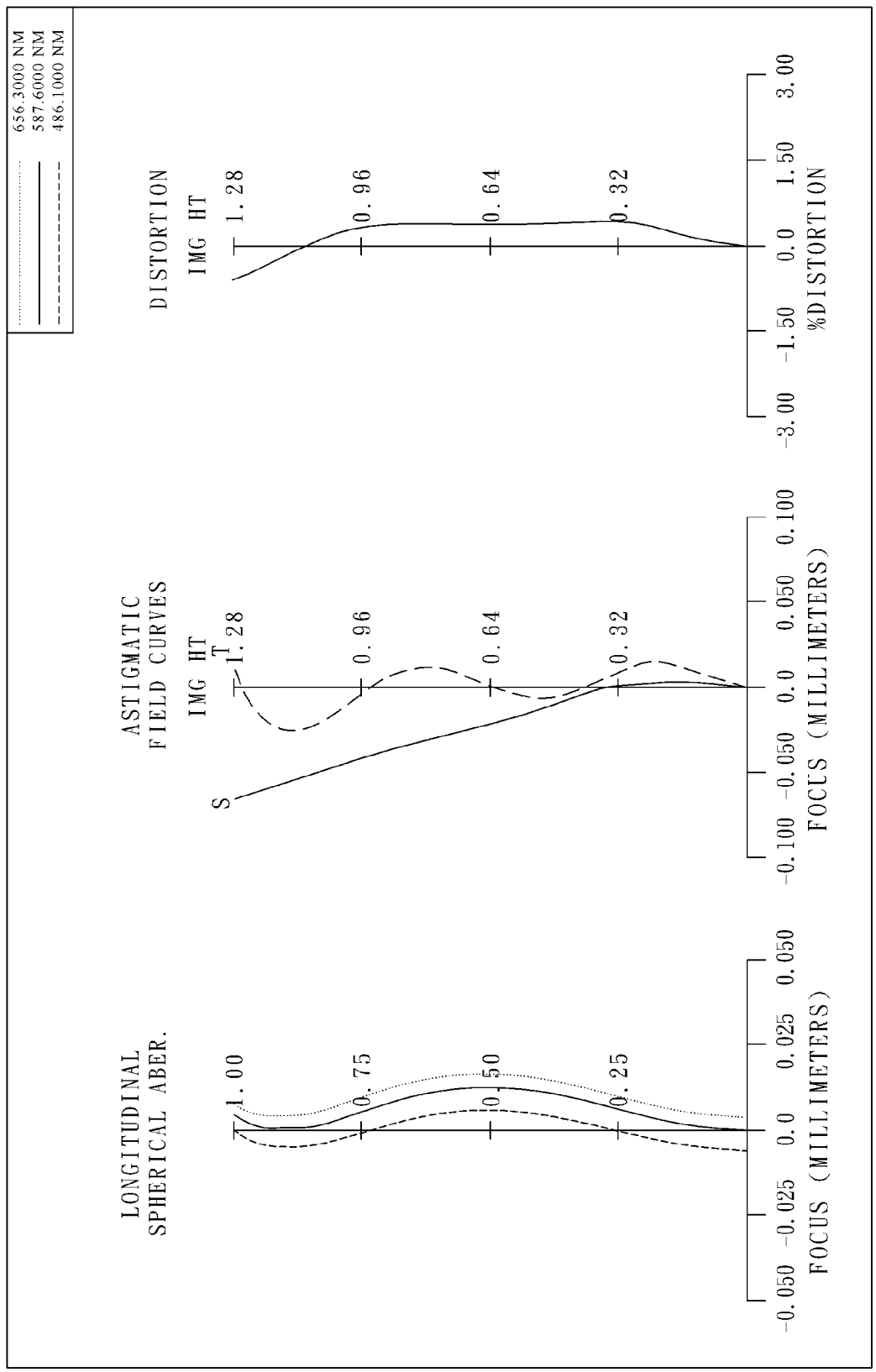
FIG. 5B shows the aberration curves of the fifth embodiment of the present invention.

FIG. 5A shows an optical image-capturing lens assembly in accordance with a fifth embodiment of the present invention, and FIG. 5B shows the aberration curves of the fifth embodiment of the present invention. The optical image-capturing lens assembly in the fifth embodiment mainly comprises four lens elements, in order from an object side to an image side: a plastic first lens element 510 with positive refractive power having a convex object-side surface 511 and a convex image-side surface 512, both of the surfaces 511 and 512 being aspheric; a plastic second lens element 520 with negative refractive power having a concave object-side surface 521 and a concave image-side surface 522, both of the surfaces 521 and 522 being aspheric; a plastic third lens element 530 with positive refractive power having a concave object-side surface 531 and a convex image-side surface 532, both of the surfaces 531 and 532 being aspheric; a plastic fourth lens element 540 with negative refractive power having a convex object-side surface 541 and a concave image-side surface 542, both of the surfaces 541 and 542 being aspheric and at least one inflection point being formed on at least one of the surfaces 541 and 542. Moreover, the optical image-capturing lens assembly is provided with a stop 500 disposed between the object and the first lens element 510. The optical image-capturing lens assembly further comprises an IR filter 550 disposed between the image-side surface 542 of the fourth lens element 540 and an image plane 560; the IR filter 550 is made of glass and has no influence on the focal length of the image-capturing lens assembly.

The equation of the aspheric surface profiles of the fifth embodiment has the same form as that of the first embodiment.

In the fifth embodiment of the present optical image-capturing lens assembly, the focal length of the assembly is f, and it satisfies the relation: f=1.66 (mm).

In the fifth embodiment of the present optical image-capturing lens assembly, the f-number of the assembly is Fno, and it satisfies the relation: Fno=2.40.

In the fifth embodiment of the present optical image-capturing lens assembly, half of the maximum field of view of the assembly is HFOV, and it satisfies the relation: HFOV=37.9 (degrees).

In the fifth embodiment of the present optical image-capturing lens assembly, the Abbe number of the first lens element 510 is V1, the Abbe number of the second lens element 520 is V2, and they satisfy the relation: V1−V2=34.5.

In the fifth embodiment of the present optical image-capturing lens assembly, the radius of curvature of the image-side surface 542 of the fourth lens element 540 is R8, the focal length of the assembly is f, and they satisfy the relation: R8/f=0.36.

In the fifth embodiment of the present optical image-capturing lens assembly, the focal length of the assembly is f, the focal length of the third lens element 530 is f3, the focal length of the first lens element 510 is f1, and they satisfy the relation: (f/f3)−(f/f1)=−0.47.

In the fifth embodiment of the present optical image-capturing lens assembly, the thickness of the second lens element 520 on the optical axis is CT2, and it satisfies the relation: CT2=0.245 (mm).

In the fifth embodiment of the present optical image-capturing lens assembly, it is further provided with an electronic sensor disposed at the image plane 560 for image formation of an object, the distance on the optical axis between the object-side surface 511 of the first lens element 510 and the electronic sensor is TTL, and it satisfies the relation: TTL=2.25 (mm).

In the fifth embodiment of the present optical image-capturing lens assembly, half of the diagonal length of the effective pixel area of the electronic sensor is ImgH, the distance on the optical axis between the object-side surface 511 of the first lens element 510 and the electronic sensor is TTL, the thickness of the second lens element 520 on the optical axis is CT2, and they satisfy the relation: $TTL/(ImgH \times CT2)^{1/2}$=4.01.

In the fifth embodiment of the present optical image-capturing lens assembly, the distance on the optical axis between the stop 500 and the electronic sensor is SL, the distance on the optical axis between the object-side surface 511 of the first lens element 510 and the electronic sensor is TTL, and they satisfy the relation: SL/TTL=0.98.

In the fifth embodiment of the present optical image-capturing lens assembly, a light ray having an incident angle of 36.5 degrees with respect to the optical axis and passing through the center of the stop 500 intersects the image-side surface 542 of the fourth lens element 540 at a point, the perpendicular distance from the point to the optical axis is Yc1, half of the diagonal length of the effective pixel area of the electronic sensor is ImgH, and they satisfy the relation: Yc1/ImgH=0.65.

In the fifth embodiment of the present optical image-capturing lens assembly, a light ray having an incident angle of 37.2 degrees with respect to the optical axis and passing through the center of the stop 500 intersects the image-side surface 542 of the fourth lens element 540 at a point, the perpendicular distance from the point to the optical axis is Yc2, half of the diagonal length of the effective pixel area of the electronic sensor is ImgH, and they satisfy the following relation: Yc2/ImgH=0.67.

The detailed optical data of the fifth embodiment is shown in FIG. 19 (TABLE 9), and the aspheric surface data is shown in FIG. 20A (TABLE 10A) and FIG. 20B (TABLE 10B), wherein the units of the radius of curvature, the thickness and the focal length are expressed in mm, and HFOV is half of the maximum field of view.

Figure 6A:
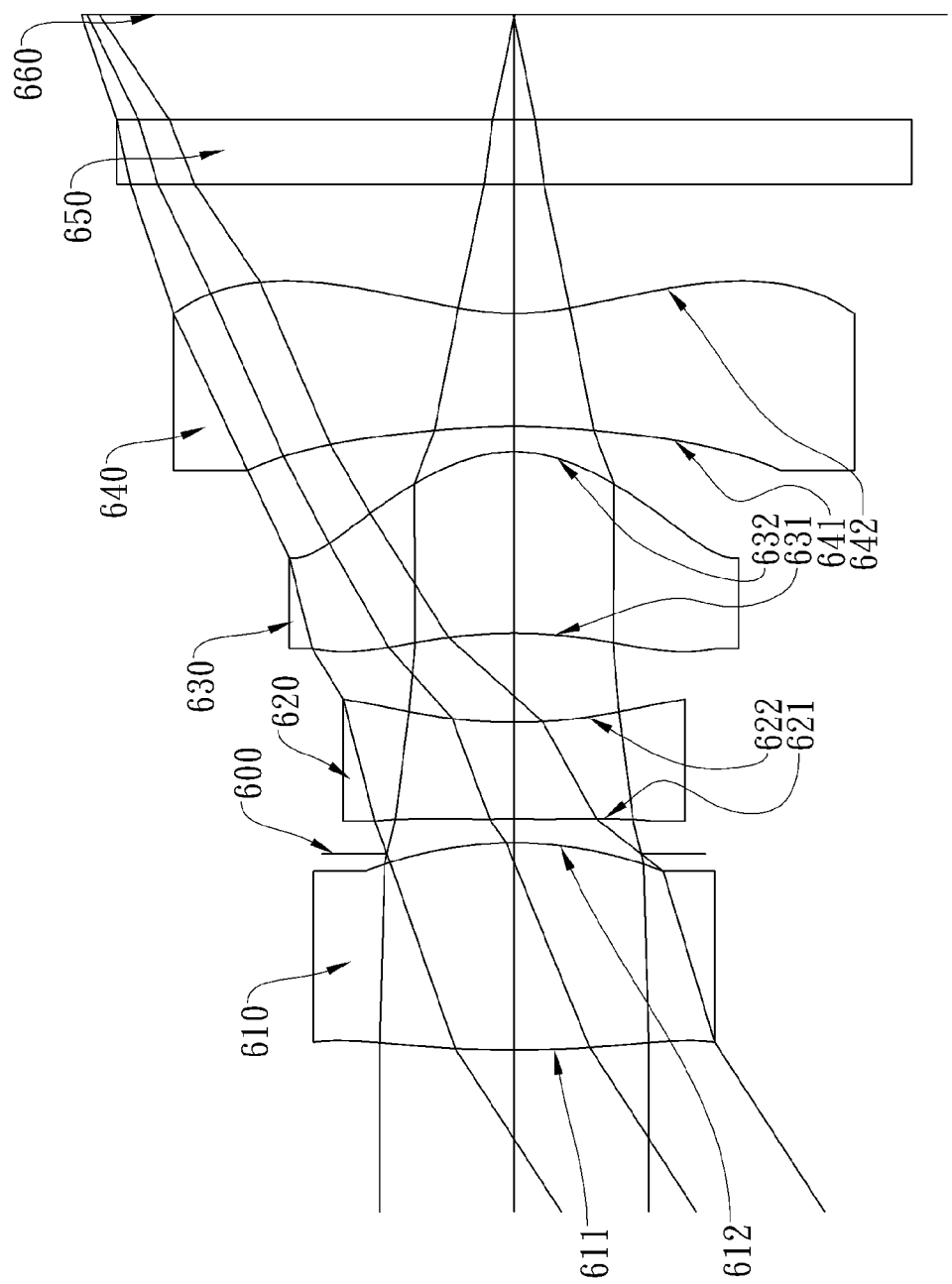
FIG. 6A shows an optical image-capturing lens assembly in accordance with a sixth embodiment of the present invention.
Figure 6B:
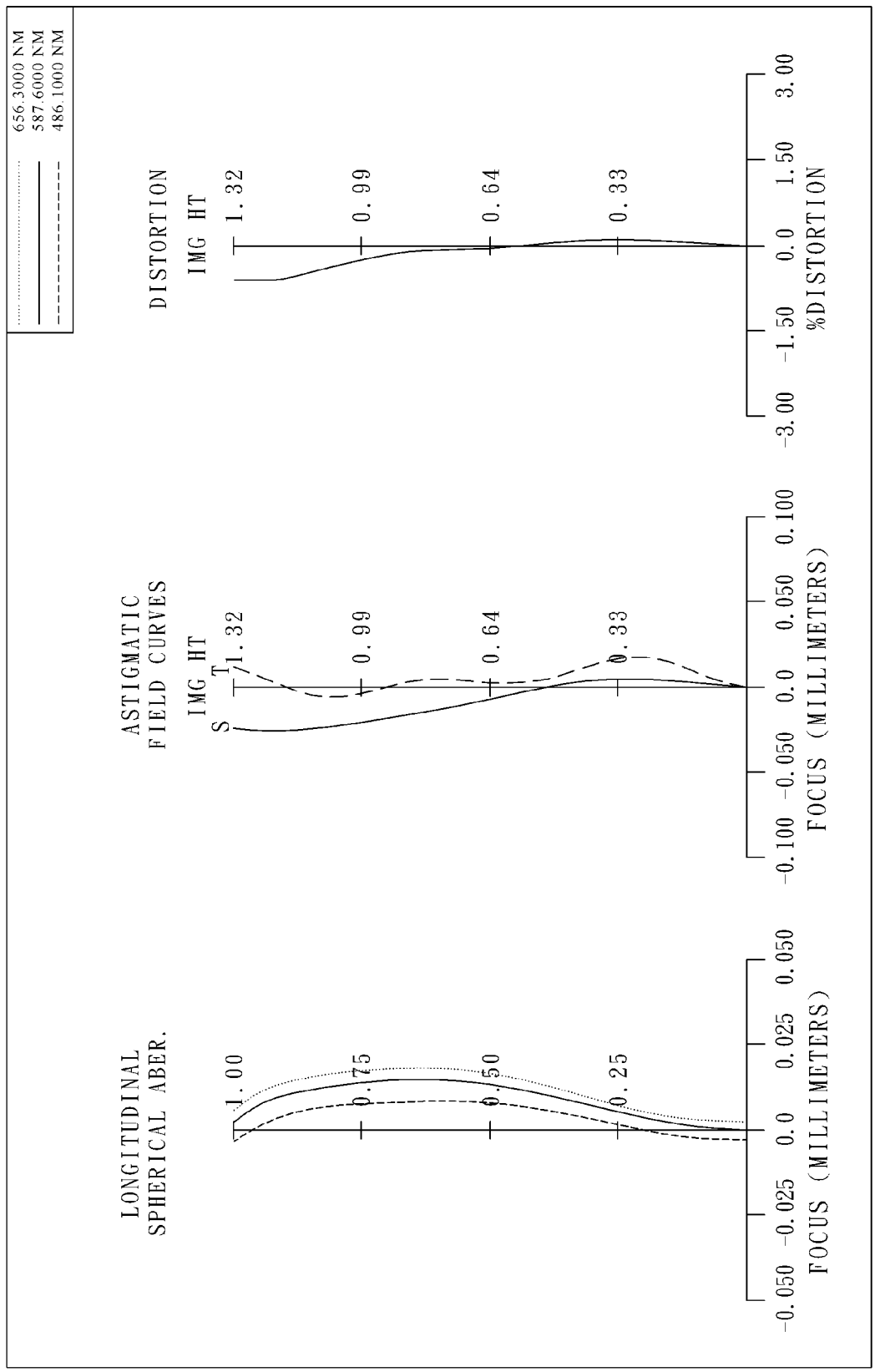
FIG. 6B shows the aberration curves of the sixth embodiment of the present invention.

FIG. 6A shows an optical image-capturing lens assembly in accordance with a sixth embodiment of the present invention, and FIG. 6B shows the aberration curves of the sixth embodiment of the present invention. The optical image-capturing lens assembly in the sixth embodiment mainly comprises four lens elements, in order from an object side to an image side: a plastic first lens element 610 with positive refractive power having a convex object-side surface 611 and a convex image-side surface 612, both of the surfaces 611 and 612 being aspheric; a plastic second lens element 620 with negative refractive power having a concave object-side surface 621 and a concave image-side surface 622, both of the surfaces 621 and 622 being aspheric; a plastic third lens element 630 with positive refractive power having a concave object-side surface 631 and a convex image-side surface 632, both of the surfaces 631 and 632 being aspheric; a plastic fourth lens element 640 with negative refractive power having a concave object-side surface 641 and a concave image-side surface 642, both of the surfaces 641 and 642 being aspheric and at least one inflection point being formed on at least one of the surfaces 641 and 642. Moreover, the optical image-capturing lens assembly is provided with a stop 600 disposed between the first lens element 610 and the second lens element 620. The optical image-capturing lens assembly further comprises an IR filter 650 disposed between the image-side surface 642 of the fourth lens element 640 and an image plane 660; the IR filter 650 is made of glass and has no influence on the focal length of the image-capturing lens assembly.

The equation of the aspheric surface profiles of the sixth embodiment has the same form as that of the first embodiment.

In the sixth embodiment of the present optical image-capturing lens assembly, the focal length of the assembly is f, and it satisfies the relation: f=2.06 (mm).

In the sixth embodiment of the present optical image-capturing lens assembly, the f-number of the assembly is Fno, and it satisfies the relation: Fno=2.45.

In the sixth embodiment of the present optical image-capturing lens assembly, half of the maximum field of view of the assembly is HFOV, and it satisfies the relation: HFOV=33.0 (degrees).

In the sixth embodiment of the present optical image-capturing lens assembly, the Abbe number of the first lens element 610 is V1, the Abbe number of the second lens element 620 is V2, and they satisfy the relation: V1−V2=32.5.

In the sixth embodiment of the present optical image-capturing lens assembly, the radius of curvature of the image-side surface 642 of the fourth lens element 640 is R8, the focal length of the assembly is f, and they satisfy the relation: R8/f=0.37.

In the sixth embodiment of the present optical image-capturing lens assembly, the focal length of the assembly is f, the focal length of the third lens element 630 is f3, the focal length of the first lens element 610 is f1, and they satisfy the relation: (f/f3)−(f/f1)=1.06.

In the sixth embodiment of the present optical image-capturing lens assembly, the thickness of the second lens element 620 on the optical axis is CT2, and it satisfies the relation: CT2=0.300 (mm).

In the sixth embodiment of the present optical image-capturing lens assembly, it is further provided with an electronic sensor disposed at the image plane 660 for image formation of an object, the distance on the optical axis between the object-side surface 611 of the first lens element 610 and the electronic sensor is TTL, and it satisfies the relation: TTL=3.14 (mm).

In the sixth embodiment of the present optical image-capturing lens assembly, half of the diagonal length of the effective pixel area of the electronic sensor is ImgH, the distance on the optical axis between the object-side surface 611 of the first lens element 610 and the electronic sensor is TTL, the thickness of the second lens element 620 on the optical axis is CT2, and they satisfy the relation: $TTL/(ImgH \times CT2)^{1/2}=4.99$.

In the sixth embodiment of the present optical image-capturing lens assembly, the distance on the optical axis between the stop 600 and the electronic sensor is SL, the distance on the optical axis between the object-side surface 611 of the first lens element 610 and the electronic sensor is TTL, and they satisfy the relation: SL/TTL=0.81.

The detailed optical data of the sixth embodiment is shown in FIG. 21 (TABLE 11), and the aspheric surface data is shown in FIG. 22 (TABLE 12), wherein the units of the radius of curvature, the thickness and the focal length are expressed in mm, and HFOV is half of the maximum field of view.

Figure 7A:
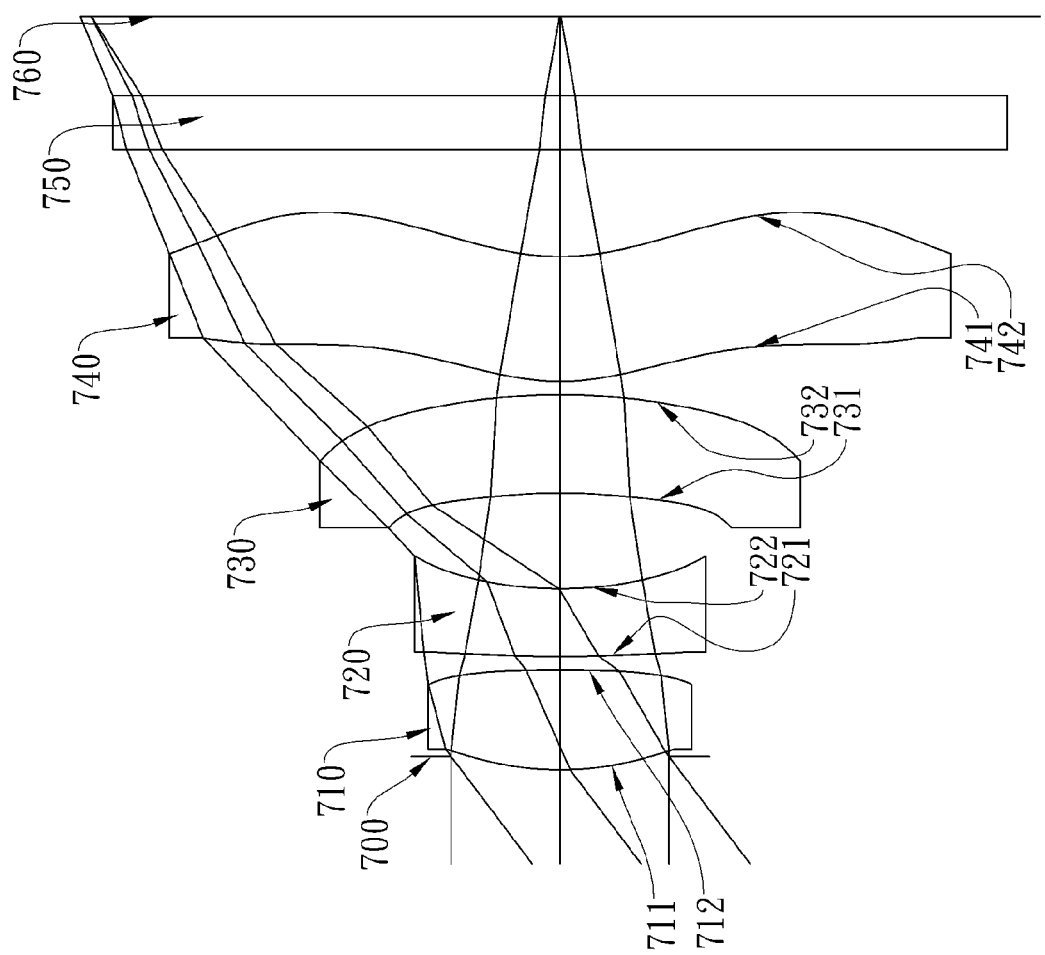
FIG. 7A shows an optical image-capturing lens assembly in accordance with a seventh embodiment of the present invention.
Figure 7B:
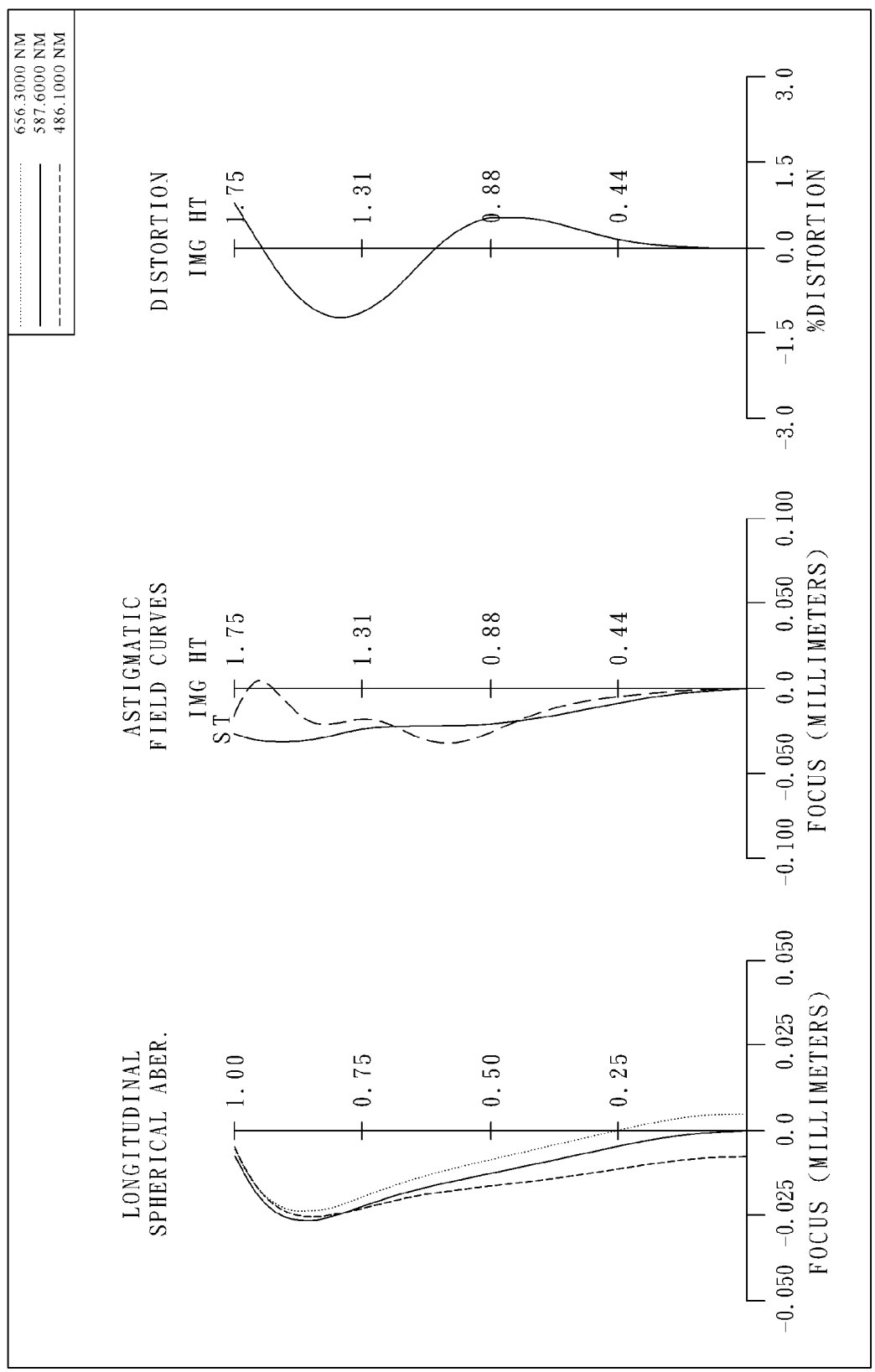
FIG. 7B shows the aberration curves of the seventh embodiment of the present invention.

FIG. 7A shows an optical image-capturing lens assembly in accordance with a seventh embodiment of the present invention, and FIG. 7B shows the aberration curves of the seventh embodiment of the present invention. The optical image-capturing lens assembly in the seventh embodiment mainly comprises four lens elements, in order from an object side to an image side: a plastic first lens element 710 with positive refractive power having a convex object-side surface 711 and a convex image-side surface 712, both of the surfaces 711 and 712 being aspheric; a plastic second lens element 720 with negative refractive power having a convex object-side surface 721 and a concave image-side surface 722, both of the surfaces 721 and 722 being aspheric; a plastic third lens element 730 with negative refractive power having a concave object-side surface 731 and a convex image-side surface 732, both of the surfaces 731 and 732 being aspheric; a plastic fourth lens element 740 with positive refractive power having a convex object-side surface 741 and a concave image-side surface 742, both of the surfaces 741 and 742 being aspheric and at least one inflection point being formed on at least one of the surfaces 741 and 742. Moreover, the optical image-capturing lens assembly is provided with a stop 700 disposed between the object and the first lens element 710. The optical image-capturing lens assembly further comprises an IR filter 750 disposed between the image-side surface 742 of the fourth lens element 740 and an image plane 760; the IR filter 750 is made of glass and has no influence on the focal length of the image-capturing lens assembly.

The equation of the aspheric surface profiles of the seventh embodiment has the same form as that of the first embodiment.

In the seventh embodiment of the present optical image-capturing lens assembly, the focal length of the assembly is f, and it satisfies the relation: f=2.30 (mm).

In the seventh embodiment of the present optical image-capturing lens assembly, the f-number of the assembly is Fno, and it satisfies the relation: Fno=2.85.

In the seventh embodiment of the present optical image-capturing lens assembly, half of the maximum field of view of the assembly is HFOV, and it satisfies the relation: HFOV=37.0 (degrees).

In the seventh embodiment of the present optical image-capturing lens assembly, the Abbe number of the first lens element 710 is V1, the Abbe number of the second lens element 720 is V2, and they satisfy the relation: V1−V2=34.5.

In the seventh embodiment of the present optical image-capturing lens assembly, the radius of curvature of the image-side surface 742 of the fourth lens element 740 is R8, the focal length of the assembly is f, and they satisfy the relation: R8/f=0.39.

In the seventh embodiment of the present optical image-capturing lens assembly, the focal length of the assembly is f, the focal length of the third lens element 730 is f3, the focal length of the first lens element 710 is f1, and they satisfy the relation: (f/f3)−(f/f1)=−1.41.

In the seventh embodiment of the present optical image-capturing lens assembly, the thickness of the second lens element 720 on the optical axis is CT2, and it satisfies the relation: CT2=0.253 (mm).

In the seventh embodiment of the present optical image-capturing lens assembly, it is further provided with an electronic sensor disposed at the image plane 760 for image formation of an object, the distance on the optical axis between the object-side surface 711 of the first lens element 710 and the electronic sensor is TTL, and it satisfies the relation: TTL=2.74 (mm).

In the seventh embodiment of the present optical image-capturing lens assembly, half of the diagonal length of the effective pixel area of the electronic sensor is ImgH, the distance on the optical axis between the object-side surface 711 of the first lens element 710 and the electronic sensor is TTL, the thickness of the second lens element 720 on the optical axis is CT2, and they satisfy the relation: $TTL/(ImgH \times CT2)^{1/2}=4.12$.

In the seventh embodiment of the present optical image-capturing lens assembly, the distance on the optical axis between the stop 700 and the electronic sensor is SL, the distance on the optical axis between the object-side surface 711 of the first lens element 710 and the electronic sensor is TTL, and they satisfy the relation: SL/TTL=0.98.

In the seventh embodiment of the present optical image-capturing lens assembly, a light ray having an incident angle of 36.5 degrees with respect to the optical axis and passing through the center of the stop 700 intersects the image-side surface 742 of the fourth lens element 740 at a point, the perpendicular distance from the point to the optical axis is Yc1, half of the diagonal length of the effective pixel area of the electronic sensor is ImgH, and they satisfy the relation: Yc1/ImgH=0.75.

The detailed optical data of the seventh embodiment is shown in FIG. 23 (TABLE 13), and the aspheric surface data is shown in FIG. 24 (TABLE 14), wherein the units of the radius of curvature, the thickness and the focal length are expressed in mm, and HFOV is half of the maximum field of view.

Figure 8A:
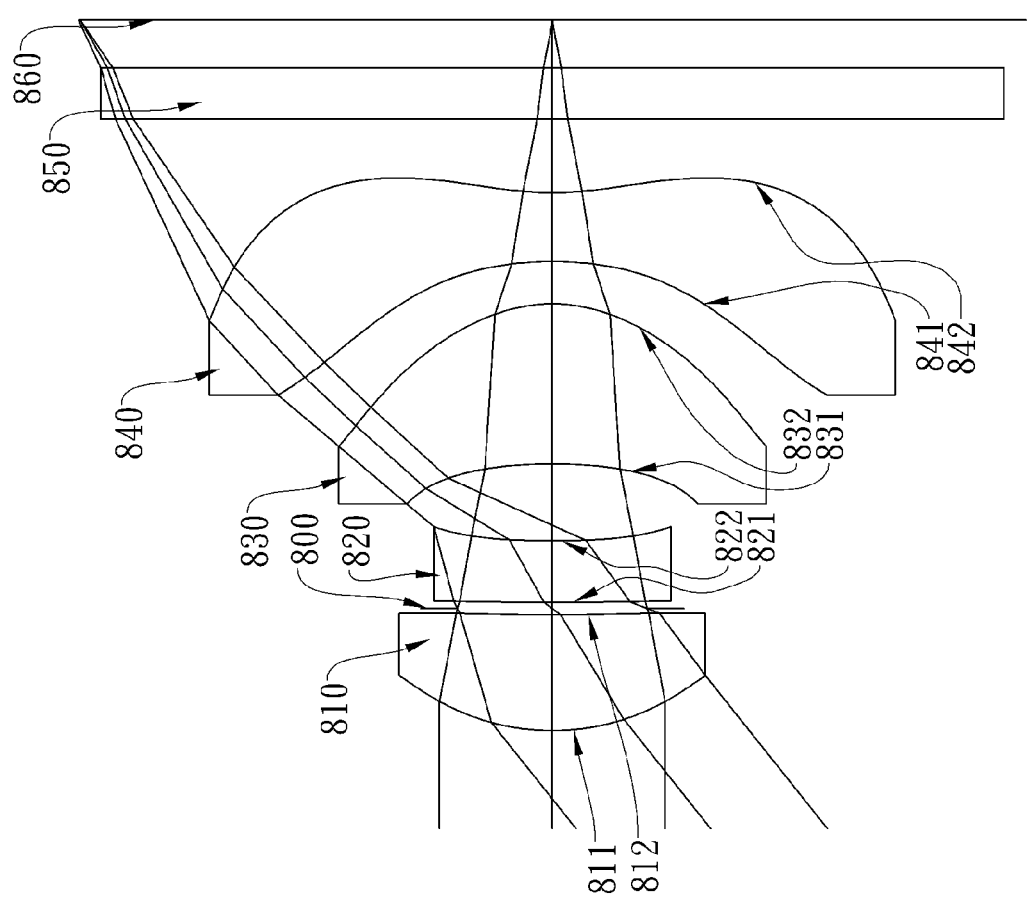
FIG. 8A shows an optical image-capturing lens assembly in accordance with an eighth embodiment of the present invention.
Figure 8B:
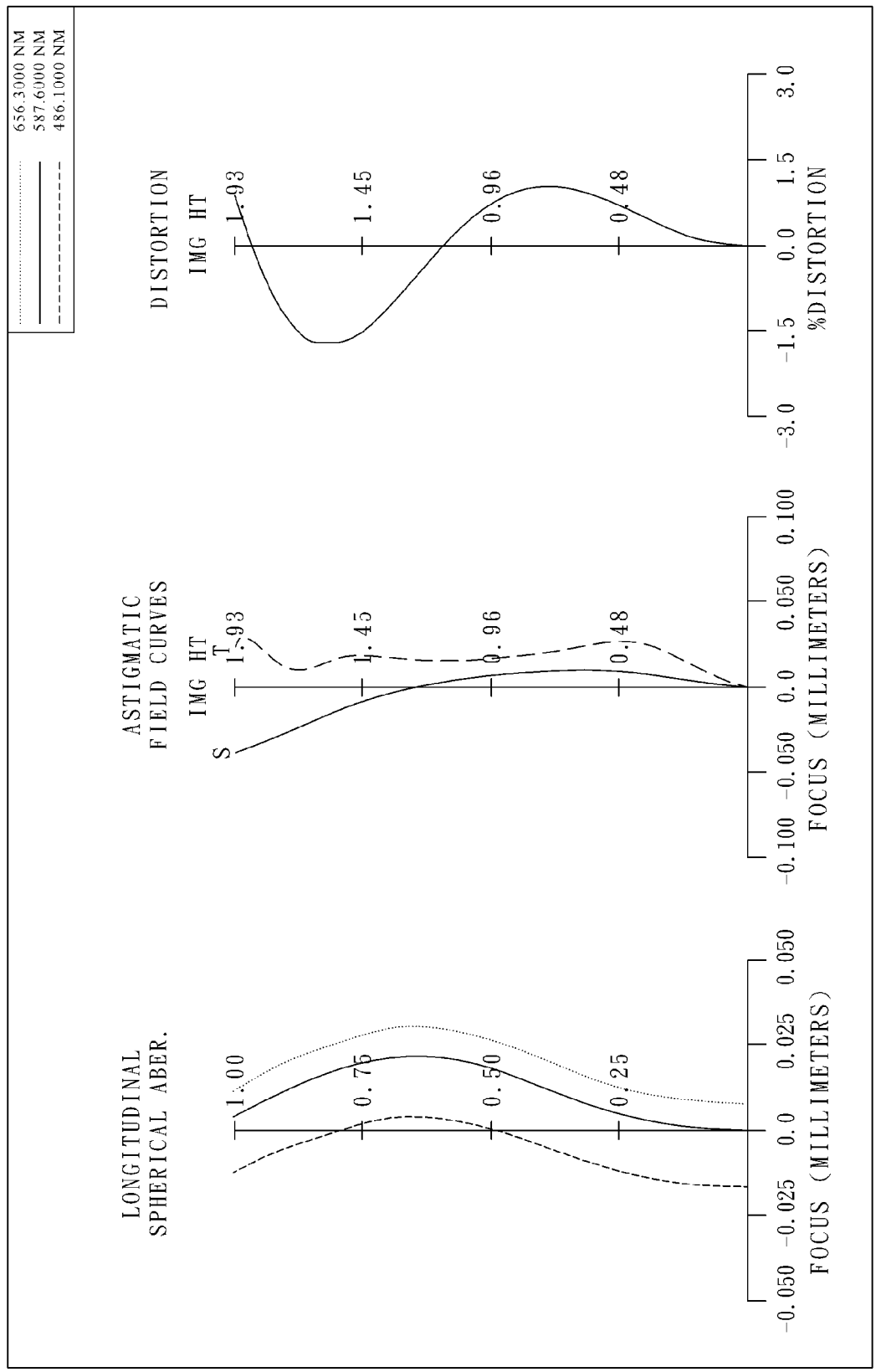
FIG. 8B shows the aberration curves of the eighth embodiment of the present invention.

FIG. 8A shows an optical image-capturing lens assembly in accordance with an eighth embodiment of the present invention, and FIG. 8B shows the aberration curves of the eighth embodiment of the present invention. The optical image-capturing lens assembly in the eighth embodiment mainly comprises four lens elements, in order from an object side to an image side: a plastic first lens element 810 with positive refractive power having a convex object-side surface 811 and a concave image-side surface 812, both of the surfaces 811 and 812 being aspheric; a plastic second lens element 820 with negative refractive power having a concave object-side surface 821 and a concave image-side surface 822, both of the surfaces 821 and 822 being aspheric; a plastic third lens element 830 with positive refractive power having a concave object-side surface 831 and a convex image-side surface 832, both of the surfaces 831 and 832 being aspheric; a plastic fourth lens element 840 with negative refractive power having a concave object-side surface 841 and a concave image-side surface 842, both of the surfaces 841 and 842 being aspheric and at least one inflection point being formed on at least one of the surfaces 841 and 842. Moreover, the optical image-capturing lens assembly is provided with a stop 800 disposed between the first lens element 810 and the second lens element 820. The optical image-capturing lens assembly further comprises an IR filter 850 disposed between the image-side surface 842 of the fourth lens element 840 and an image plane 860; the IR filter 850 is made of glass and has no influence on the focal length of the image-capturing lens assembly.

The equation of the aspheric surface profiles of the eighth embodiment has the same form as that of the first embodiment.

In the eighth embodiment of the present optical image-capturing lens assembly, the focal length of the assembly is f, and it satisfies the relation: f=2.42 (mm).

In the eighth embodiment of the present optical image-capturing lens assembly, the f-number of the assembly is Fno, and it satisfies the relation: Fno=2.60.

In the eighth embodiment of the present optical image-capturing lens assembly, half of the maximum field of view of the assembly is HFOV, and it satisfies the relation: HFOV=38.5 (degrees).

In the eighth embodiment of the present optical image-capturing lens assembly, the Abbe number of the first lens element 810 is V1, the Abbe number of the second lens element 820 is V2, and they satisfy the relation: V1−V2=32.1.

In the eighth embodiment of the present optical image-capturing lens assembly, the radius of curvature of the image-side surface 842 of the fourth lens element 840 is R8, the focal length of the assembly is f, and they satisfy the relation: R8/f=0.49.

In the eighth embodiment of the present optical image-capturing lens assembly, the focal length of the assembly is f, the focal length of the third lens element 830 is f3, the focal length of the first lens element 810 is f1, and they satisfy the relation: (f/f3)−(f/f1)=0.40.

In the eighth embodiment of the present optical image-capturing lens assembly, the thickness of the second lens element 820 on the optical axis is CT2, and it satisfies the relation: CT2=0.250 (mm).

In the eighth embodiment of the present optical image-capturing lens assembly, it is further provided with an electronic sensor disposed at the image plane 860 for image formation of an object, the distance on the optical axis between the object-side surface 811 of the first lens element 810 and the electronic sensor is TTL, and it satisfies the relation: TTL=2.83 (mm).

In the eighth embodiment of the present optical image-capturing lens assembly, half of the diagonal length of the effective pixel area of the electronic sensor is ImgH, the distance on the optical axis between the object-side surface 811 of the first lens element 810 and the electronic sensor is TTL, the thickness of the second lens element 820 on the optical axis is CT2, and they satisfy the relation: TTL/(ImgH× CT2)$^{1/2}$=4.08.

In the eighth embodiment of the present optical image-capturing lens assembly, the distance on the optical axis between the stop 800 and the electronic sensor is SL, the distance on the optical axis between the object-side surface 811 of the first lens element 810 and the electronic sensor is TTL, and they satisfy the relation: SL/TTL=0.82.

In the eighth embodiment of the present optical image-capturing lens assembly, a light ray having an incident angle of 36.5 degrees with respect to the optical axis and passing through the center of the stop 800 intersects the image-side surface 842 of the fourth lens element 840 at a point, the perpendicular distance from the point to the optical axis is Yc1, half of the diagonal length of the effective pixel area of the electronic sensor is ImgH, and they satisfy the relation: Yc1/ImgH=0.70.

In the eighth embodiment of the present optical image-capturing lens assembly, a light ray having an incident angle of 37.2 degrees with respect to the optical axis and passing through the center of the stop 800 intersects the image-side surface 842 of the fourth lens element 840 at a point, the perpendicular distance from the point to the optical axis is Yc2, half of the diagonal length of the effective pixel area of the electronic sensor is ImgH, and they satisfy the following relation: Yc2/ImgH=0.71.

The detailed optical data of the eighth embodiment is shown in FIG. 25 (TABLE 15), and the aspheric surface data is shown in FIG. 26 (TABLE 16), wherein the units of the radius of curvature, the thickness and the focal length are expressed in mm, and HFOV is half of the maximum field of view.

Figure 9A:
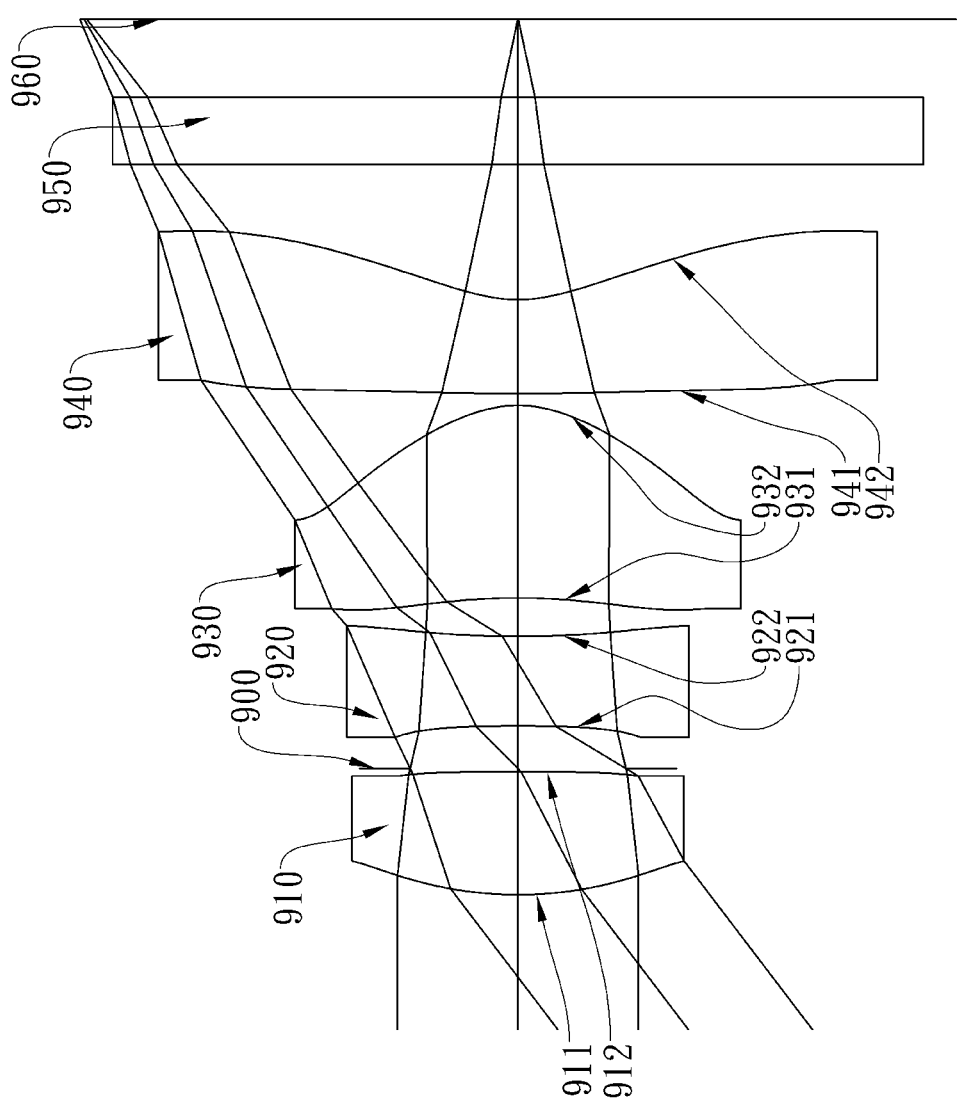
FIG. 9A shows an optical image-capturing lens assembly in accordance with a ninth embodiment of the present invention.
Figure 9B:
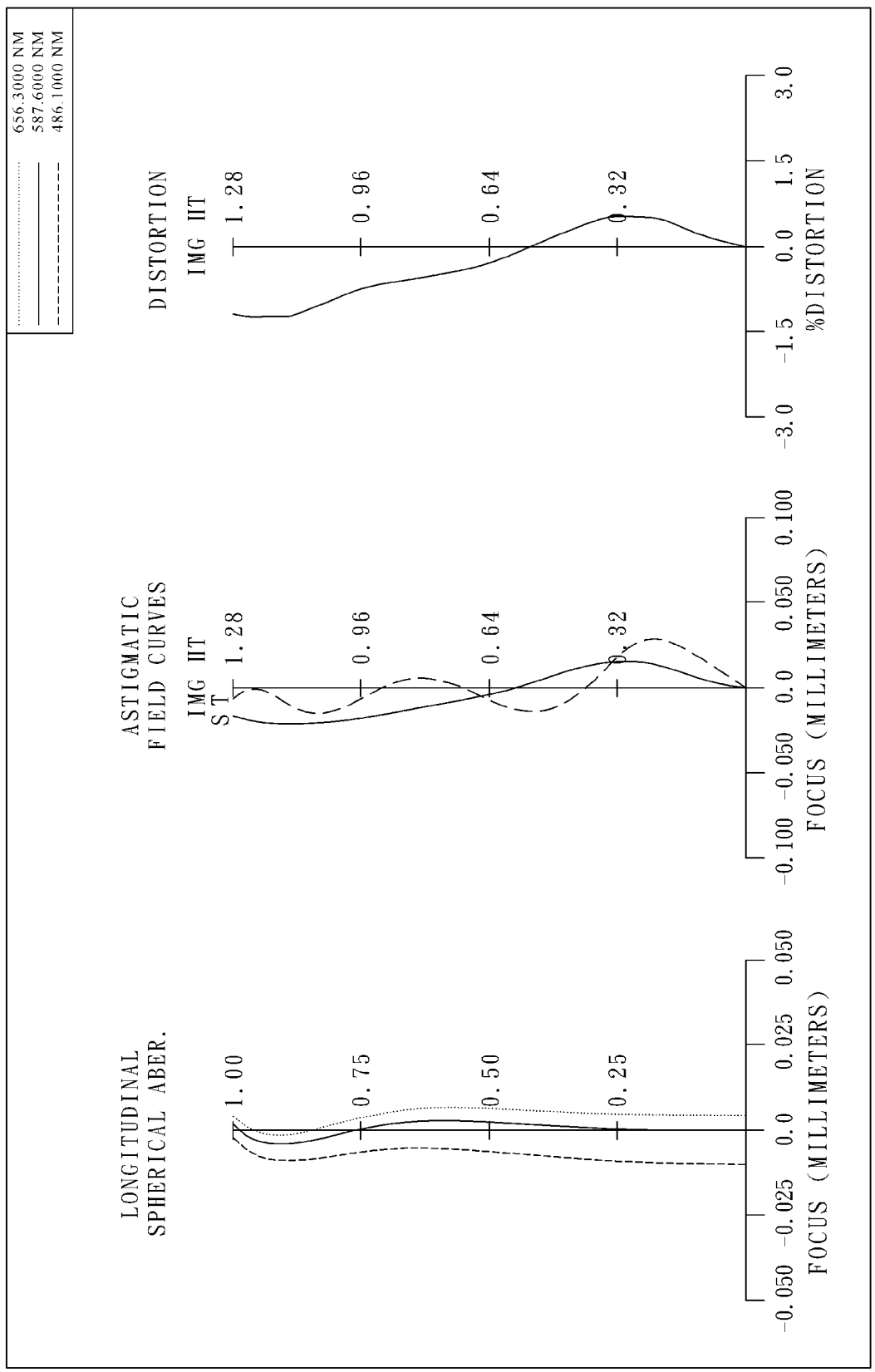
FIG. 9B shows the aberration curves of the ninth embodiment of the present invention.

FIG. 9A shows an optical image-capturing lens assembly in accordance with a ninth embodiment of the present invention, and FIG. 9B shows the aberration curves of the ninth embodiment of the present invention. The optical image-capturing lens assembly in the ninth embodiment mainly comprises four lens elements, in order from an object side to an image side: a plastic first lens element 910 with positive refractive power having a convex object-side surface 911 and a convex image-side surface 912, both of the surfaces 911 and 912 being aspheric; a plastic second lens element 920 with negative refractive power having a concave object-side surface 921 and a concave image-side surface 922, both of the surfaces 921 and 922 being aspheric; a plastic third lens element 930 with positive refractive power having a concave object-side surface 931 and a convex image-side surface 932, both of the surfaces 931 and 932 being aspheric; a plastic fourth lens element 940 with negative refractive power having a convex object-side surface 941 and a concave image-side surface 942, both of the surfaces 941 and 942 being aspheric and at least one inflection point being formed on at least one of the surfaces 941 and 942. Moreover, the optical image-capturing lens assembly is provided with a stop 900 disposed between the first lens element 910 and the second lens element 920. The optical image-capturing lens assembly further comprises an IR filter 950 disposed between the image-side surface 942 of the fourth lens element 940 and an image plane 960; the IR filter 950 is made of glass and has no influence on the focal length of the image-capturing lens assembly.

The equation of the aspheric surface profiles of the ninth embodiment has the same form as that of the first embodiment.

In the ninth embodiment of the present optical image-capturing lens assembly, the focal length of the assembly is f, and it satisfies the relation: f=1.71 (mm).

In the ninth embodiment of the present optical image-capturing lens assembly, the f-number of the assembly is Fno, and it satisfies the relation: Fno=2.40.

In the ninth embodiment of the present optical image-capturing lens assembly, half of the maximum field of view of the assembly is HFOV, and it satisfies the relation: HFOV=37.2 (degrees).

In the ninth embodiment of the present optical image-capturing lens assembly, the Abbe number of the first lens element 910 is V1, the Abbe number of the second lens element 920 is V2, and they satisfy the relation: V1−V2=32.5.

In the ninth embodiment of the present optical image-capturing lens assembly, the radius of curvature of the image-side surface 942 of the fourth lens element 940 is R8, the focal length of the assembly is f, and they satisfy the relation: R8/f=0.24.

In the ninth embodiment of the present optical image-capturing lens assembly, the focal length of the assembly is f, the focal length of the third lens element 930 is f3, the focal length of the first lens element 910 is f1, and they satisfy the relation: (f/f3)−(f/f1)=1.55.

In the ninth embodiment of the present optical image-capturing lens assembly, the thickness of the second lens element 920 on the optical axis is CT2, and it satisfies the relation: CT2=0.266 (mm).

In the ninth embodiment of the present optical image-capturing lens assembly, it is further provided with an electronic sensor disposed at the image plane 960 for image formation of an object, the distance on the optical axis between the object-side surface 911 of the first lens element 910 and the electronic sensor is TTL, and it satisfies the relation: TTL=2.53 (mm).

In the ninth embodiment of the present optical image-capturing lens assembly, half of the diagonal length of the effective pixel area of the electronic sensor is ImgH, the distance on the optical axis between the object-side surface 911 of the first lens element 910 and the electronic sensor is TTL, the thickness of the second lens element 920 on the optical axis is CT2, and they satisfy the relation: TTL/(ImgH× CT2)$^{1/2}$=4.33.

In the ninth embodiment of the present optical image-capturing lens assembly, the distance on the optical axis between the stop 900 and the electronic sensor is SL, the distance on the optical axis between the object-side surface 911 of the first lens element 910 and the electronic sensor is TTL, and they satisfy the relation: SL/TTL=0.85.

In the ninth embodiment of the present optical image-capturing lens assembly, a light ray having an incident angle of 36.5 degrees with respect to the optical axis and passing through the center of the stop 900 intersects the image-side surface 942 of the fourth lens element 940 at a point, the perpendicular distance from the point to the optical axis is Yc1, half of the diagonal length of the effective pixel area of the electronic sensor is ImgH, and they satisfy the relation: Yc1/ImgH=0.72.

In the ninth embodiment of the present optical image-capturing lens assembly, a light ray having an incident angle of 37.2 degrees with respect to the optical axis and passing through the center of the stop 900 intersects the image-side surface 942 of the fourth lens element 940 at a point, the perpendicular distance from the point to the optical axis is Yc2, half of the diagonal length of the effective pixel area of the electronic sensor is ImgH, and they satisfy the following relation: Yc2/ImgH=0.75.

The detailed optical data of the ninth embodiment is shown in FIG. 27 (TABLE 17), and the aspheric surface data is shown in FIG. 28 (TABLE 18) wherein the units of the radius of curvature, the thickness and the focal length are expressed in mm, and HFOV is half of the maximum field of view.

Figure 10A:
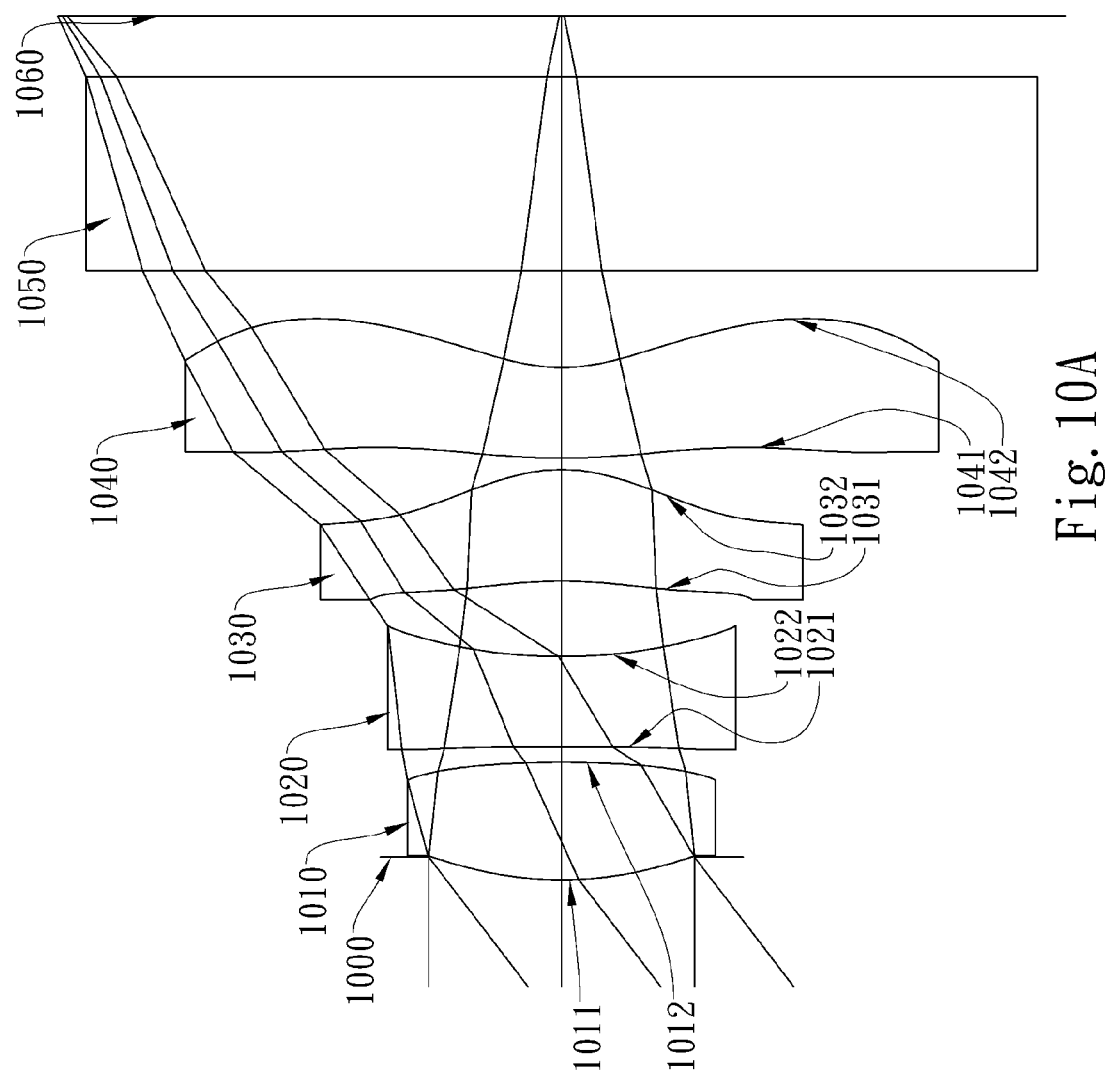
FIG. 10A shows an optical image-capturing lens assembly in accordance with a tenth embodiment of the present invention.
Figure 10B:
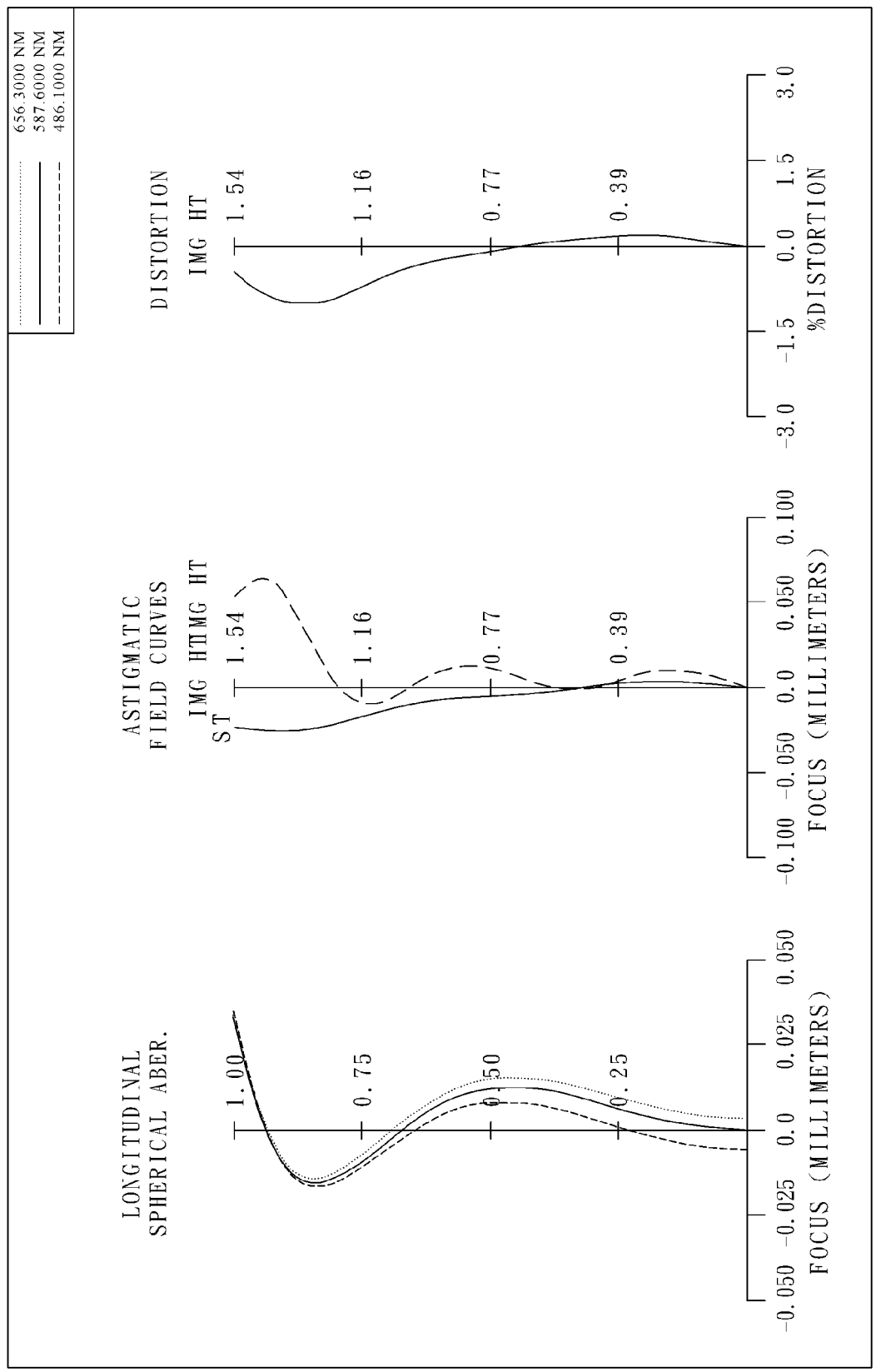
FIG. 10B shows the aberration curves of the tenth embodiment of the present invention.

FIG. 10A shows an optical image-capturing lens assembly in accordance with a tenth embodiment of the present invention, and FIG. 10B shows the aberration curves of the tenth embodiment of the present invention. The optical image-capturing lens assembly in the tenth embodiment mainly comprises four lens elements, in order from an object side to an image side: a plastic first lens element 1010 with positive refractive power having a convex object-side surface 1011 and a convex image-side surface 1012, both of the surfaces 1011 and 1012 being aspheric; a plastic second lens element 1020 with negative refractive power having a concave object-side surface 1021 and a concave image-side surface 1022, both of the surfaces 1021 and 1022 being aspheric; a plastic third lens element 1030 with positive refractive power having a concave object-side surface 1031 and a convex image-side surface 1032, both of the surfaces 1031 and 1032 being aspheric; a plastic fourth lens element 1040 with negative refractive power having a convex object-side surface 1041 and a concave image-side surface 1042, both of the surfaces 1041 and 1042 being aspheric and at least one inflection point being formed on at least one of the surfaces 1041 and 1042. Moreover, the optical image-capturing lens assembly is provided with a stop 1000 disposed between the object and the first lens element 1010. The optical image-capturing lens assembly further comprises an IR filter 1050 disposed between the image-side surface 1042 of the fourth lens element 1040 and an image plane 1060; the IR filter 1050 is made of glass and has no influence on the focal length of the image-capturing lens assembly.

The equation of the aspheric surface profiles of the tenth embodiment has the same form as that of the first embodiment.

In the tenth embodiment of the present optical image-capturing lens assembly, the focal length of the assembly is f, and it satisfies the relation: f=2.03 (mm).

In the tenth embodiment of the present optical image-capturing lens assembly, the f-number of the assembly is Fno, and it satisfies the relation: Fno=2.47.

In the tenth embodiment of the present optical image-capturing lens assembly, half of the maximum field of view of the assembly is HFOV, and it satisfies the relation: HFOV=37.5 (degrees).

In the tenth embodiment of the present optical image-capturing lens assembly, the Abbe number of the first lens element 1010 is V1, the Abbe number of the second lens element 1020 is V2, and they satisfy the relation: V1−V2=32.1.

In the tenth embodiment of the present optical image-capturing lens assembly, the radius of curvature of the image-side surface 1042 of the fourth lens element 1040 is R8, the focal length of the assembly is f, and they satisfy the relation: R8/f=0.25.

In the tenth embodiment of the present optical image-capturing lens assembly, the focal length of the assembly is f, the focal length of the third lens element 1030 is f3, the focal length of the first lens element 1010 is f1, and they satisfy the relation: (f/f3)−(f/f1)=0.33.

In the tenth embodiment of the present optical image-capturing lens assembly, the thickness of the second lens element 1020 on the optical axis is CT2, and it satisfies the relation: CT2=0.280 (mm).

In the tenth embodiment of the present optical image-capturing lens assembly, it is further provided with an electronic sensor disposed at the image plane 1060 for image formation of an object, the distance on the optical axis between the object-side surface 1011 of the first lens element 1010 and the electronic sensor is TTL, and it satisfies the relation: TTL=2.47 (mm).

In the tenth embodiment of the present optical image-capturing lens assembly, half of the diagonal length of the effective pixel area of the electronic sensor is ImgH, the distance on the optical axis between the object-side surface 1011 of the first lens element 1010 and the electronic sensor is TTL, the thickness of the second lens element 1020 on the optical axis is CT2, and they satisfy the relation: TTL/(ImgH× CT2)$^{1/2}$=3.76.

In the tenth embodiment of the present optical image-capturing lens assembly, the distance on the optical axis between the stop 1000 and the electronic sensor is SL, the distance on the optical axis between the object-side surface 1011 of the first lens element 1010 and the electronic sensor is TTL, and they satisfy the relation: SL/TTL=0.97.

In the tenth embodiment of the present optical image-capturing lens assembly, a light ray having an incident angle of 36.5 degrees with respect to the optical axis and passing through the center of the stop 1000 intersects the image-side surface 1042 of the fourth lens element 1040 at a point, the perpendicular distance from the point to the optical axis is Yc1, half of the diagonal length of the effective pixel area of the electronic sensor is ImgH, and they satisfy the relation: Yc1/ImgH=0.66.

In the tenth embodiment of the present optical image-capturing lens assembly, a light ray having an incident angle of 37.2 degrees with respect to the optical axis and passing through the center of the stop 1000 intersects the image-side surface 1042 of the fourth lens element 1040 at a point, the perpendicular distance from the point to the optical axis is Yc2, half of the diagonal length of the effective pixel area of the electronic sensor is ImgH, and they satisfy the following relation: Yc2/ImgH=0.69.

The detailed optical data of the tenth embodiment is shown in FIG. 29 (TABLE 19), and the aspheric surface data is shown in FIG. 30A (TABLE 20A) and FIG. 30B (TABLE 20B), wherein the units of the radius of curvature, the thickness and the focal length are expressed in mm, and HFOV is half of the maximum field of view.

Figure 32:
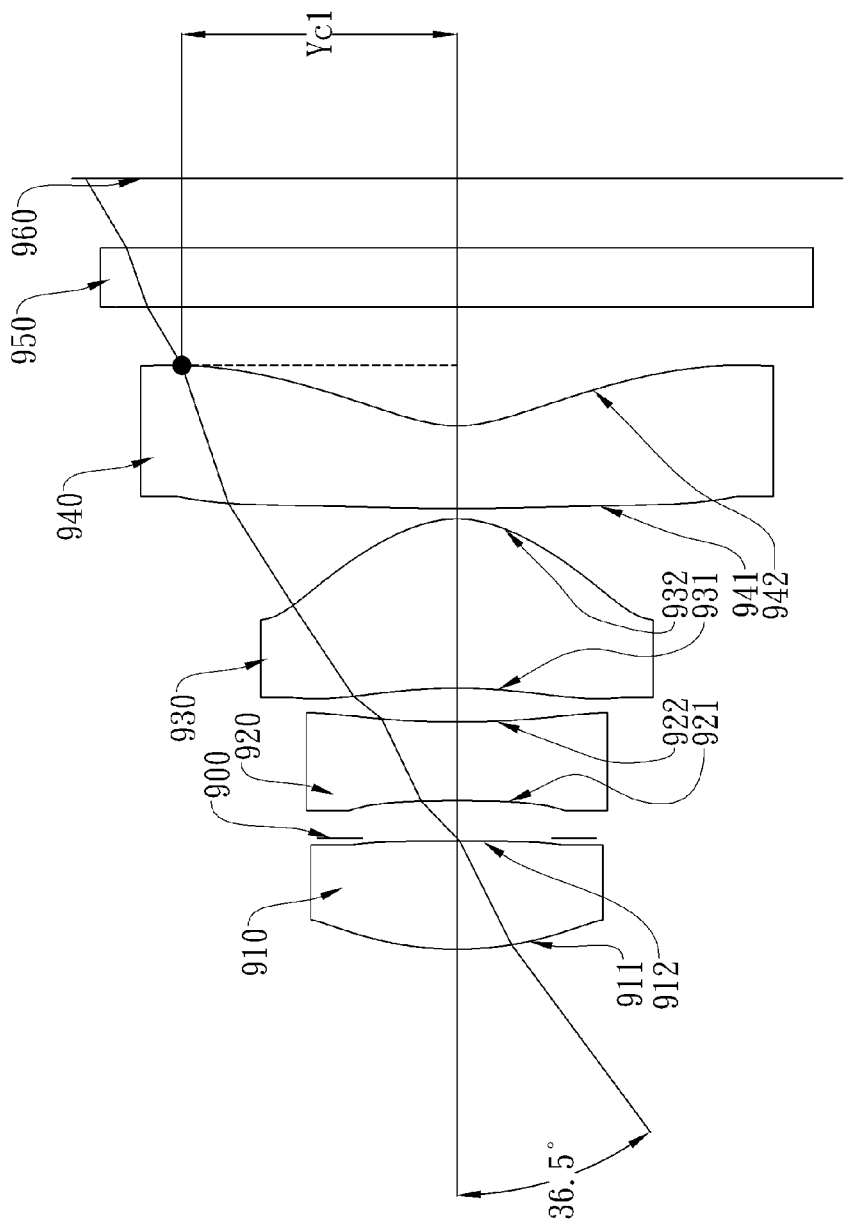
FIG. 32 is a schematic view showing how Yc1 is defined in the ninth embodiment of the present optical image-capturing lens assembly.

FIG. 32 is a schematic view showing how Yc1 is defined in the ninth embodiment of the present optical image-capturing lens assembly. A light ray having an incident angle of 36.5 degrees with respect to the optical axis and passing through the center of the stop 900 intersects the image-side surface 942 of the fourth lens element 940 at a point. The perpendicular distance from the point to the optical axis is defined as Yc1.

Figure 33:
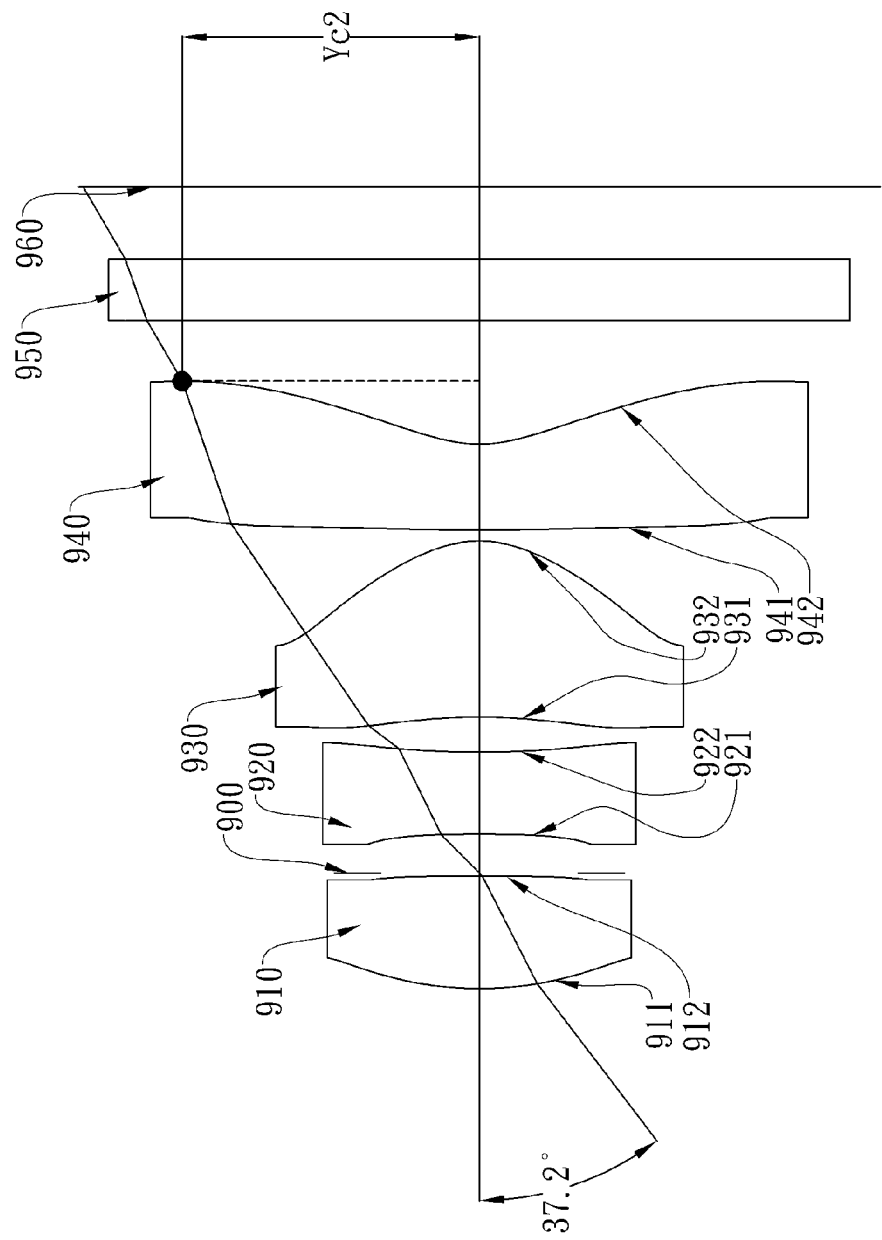
FIG. 33 is a schematic view showing how Yc2 is defined in the ninth embodiment of the present optical image-capturing lens assembly.

FIG. 33 is a schematic view showing how Yc2 is defined in the ninth embodiment of the present optical image-capturing lens assembly. A light ray having an incident angle of 37.2 degrees with respect to the optical axis and passing through the center of the stop 900 intersects the image-side surface 942 of the fourth lens element 940 at a point. The perpendicular distance from the point to the optical axis is defined as Yc2.

It is to be noted that TABLES 1-20B (illustrated in FIGS. 11-30B respectively) show different data of the different embodiments; however, the data of the different embodiments are obtained from experiments. Therefore, any optical image-capturing lens assembly of the same structure is considered to be within the scope of the present invention even if it uses different data. The preferred embodiments depicted above are exemplary and are not intended to limit the scope of the present invention. TABLE 21 (illustrated in FIG. 31) shows the data of the respective embodiments resulting from the equations.

What is claimed is:

1. An optical image-capturing lens assembly comprising, in order from an object side to an image side:
    a first lens element with positive refractive power;
    a second lens element with negative refractive power;
    a third lens element, the object-side and image-side surfaces thereof being aspheric; and
    a fourth lens element having a concave image-side surface, the object-side and image-side surfaces thereof being aspheric and at least one inflection point being formed on at least one of the object-side and image-side surfaces thereof,
    wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the stop and the electronic sensor is SL, a distance on the optical axis between the object-side surface of the first lens element and the electronic sensor is TTL, and they satisfy the following relations:

$0.35 < Yc1/ImgH < 0.95;$ $0.70 < SL/TTL < 1.20.$

2. The optical image-capturing lens assembly according to claim 1, wherein the second lens element has a concave image-side surface, and the third lens element has a concave object-side surface and a convex image-side surface.

3. The optical image-capturing lens assembly according to claim 2, wherein the third lens element has positive refractive power and the fourth lens element has negative refractive power.

4. The optical image-capturing lens assembly according to claim 3, wherein the second lens element has a concave object-side surface.

5. The optical image-capturing lens assembly according to claim 3, wherein the radius of curvature of the image-side surface of the fourth lens element is R8, the focal length of the optical image-capturing lens assembly is f, and they satisfy the following relation:

$0.10 < R8/f < 0.45.$

6. The optical image-capturing lens assembly according to claim 1, wherein the focal length of the optical image-capturing lens assembly is f, the focal length of the third lens element is f3, the focal length of the first lens element is f1, and they satisfy the following relation:

$0.70 < (f/f3) - (f/f1) < 2.00.$

7. The optical image-capturing lens assembly according to claim 6, wherein the thickness of the second lens element on the optical axis is CT2, and it satisfies the following relation:

$0.15 \text{ mm} < CT2 < 0.32 \text{ mm}.$

8. The optical image-capturing lens assembly according to claim 1, wherein the Abbe number of the first lens element is V1, the Abbe number of the second lens element is V2, and they satisfy the following relation:

$28.5 < V1 - V2 < 42.0.$

9. The optical image-capturing lens assembly according to claim 1, wherein a light ray having an incident angle of 37.2 degrees with respect to the optical axis and passing through the center of the stop intersects the image-side surface of the fourth lens element at a point, the perpendicular distance from the point to the optical axis is Yc2, half of the diagonal length of the effective pixel area of the electronic sensor is ImgH, and they satisfy the following relation:

$0.50 < Yc2/ImgH < 0.95.$

10. The optical image-capturing lens assembly according to claim 1, wherein the distance on the optical axis between the object-side surface of the first lens element and the electronic sensor is TTL, and it satisfies the following relation:

$1.80 \text{ mm} < TTL < 3.20 \text{ mm}.$

11. The optical image-capturing lens assembly according to claim 10, wherein the distance on the optical axis between the object-side surface of the first lens element and the electronic sensor is TTL, and it satisfies the following relation:

$$2.20\ mm<TTL<2.70\ mm.$$

12. An optical image-capturing lens assembly comprising, in order from an object side to an image side:
    a first lens element with positive refractive power;
    a second lens element with negative refractive power;
    a plastic third lens element, the object-side and image-side surfaces thereof being aspheric; and
    a plastic fourth lens element having a concave image-side surface, the object-side and image-side surfaces thereof being aspheric and at least one inflection point being formed on at least one of the object-side and image-side surfaces thereof,
    wherein the assembly is further provided with a stop and an electronic sensor for image formation of an object, the stop is disposed between the object and the second lens element, the electronic sensor is disposed at an image plane, a light ray having an incident angle of 36.5 degrees with respect to an optical axis and passing through a center of the stop intersects the image-side surface of the fourth lens element at a point, a perpendicular distance from the point to the optical axis is Yc1, half of a diagonal length of an effective pixel area of the electronic sensor is ImgH, a distance on the optical axis between the object-side surface of the first lens element and the electronic sensor is TTL, and they satisfy the following relations:

$$0.35<Yc1/ImgH<0.95;\ and$$

$$1.80\ mm<TTL<3.20\ mm.$$

13. The optical image-capturing lens assembly according to claim 12, wherein the first lens element has a convex object-side surface and the second lens element has a concave image-side surface.

14. The optical image-capturing lens assembly according to claim 13, wherein the third lens element has positive refractive power with a concave object-side surface and a convex image-side surface, and the fourth lens element has negative refractive power.

15. The optical image-capturing lens assembly according to claim 14, wherein the focal length of the optical image-capturing lens assembly is f, the focal length of the third lens element is f3, the focal length of the first lens element is f1, and they satisfy the following relation:

$$0.70<(f/f3)-(f/f1)<2.00.$$

16. The optical image-capturing lens assembly according to claim 15, wherein the fourth lens element has a concave object-side surface.

17. The optical image-capturing lens assembly according to claim 15, wherein the second lens element has a concave object-side surface.

18. The optical image-capturing lens assembly according to claim 14, wherein the Abbe number of the first lens element is V1, the Abbe number of the second lens element is V2, and they satisfy the following relation:

$$28.5<V1-V2<42.0.$$

19. The optical image-capturing lens assembly according to claim 14, wherein half of the diagonal length of the effective pixel area of the electronic sensor is ImgH, the distance on the optical axis between the object-side surface of the first lens element and the electronic sensor is TTL, the thickness of the second lens element on the optical axis is CT2, and they satisfy the following relation:

$$2.50<TTL/(ImgH\times CT2)^{1/2}<4.35.$$

20. The optical image-capturing lens assembly according to claim 12, wherein the distance on the optical axis between the object-side surface of the first lens element and the electronic sensor is TTL, and it satisfies the following relation:

$$2.20\ mm<TTL<2.70\ mm.$$

21. An optical image-capturing lens assembly comprising, in order from an object side to an image side:
    a first lens element with positive refractive power having a convex object-side surface;
    a second lens element with negative refractive power;
    a plastic third lens element, the object-side and image-side surfaces thereof being aspheric; and
    a plastic fourth lens element having a concave image-side surface, the object-side and image-side surfaces thereof being aspheric and at least one inflection point being formed on at least one of the object-side and image-side surfaces thereof,
    wherein the assembly is further provided with an electronic sensor for image formation of an object, the electronic sensor is disposed at an image plane, a distance on the optical axis between the object-side surface of the first lens element and the electronic sensor is TTL, and they satisfy the following relation:

$$1.80\ mm<TTL<3.20\ mm.$$

22. The optical image-capturing lens assembly according to claim 21, wherein the second lens element has a concave image-side surface, and the third lens element has a concave object-side surface and a convex image-side surface.

23. The optical image-capturing lens assembly according to claim 22, wherein the third lens element has positive refractive power and the fourth element has negative refractive power.

24. The optical image-capturing lens assembly according to claim 23, wherein the focal length of the optical image-capturing lens assembly is f, the focal length of the third lens element is f3, the focal length of the first lens element is f1, and they satisfy the following relation:

$$0.70<(f/f3)-(f/f1)<2.00.$$

25. The optical image-capturing lens assembly according to claim 23, wherein the Abbe number of the first lens element is V1, the Abbe number of the second lens element is V2, and they satisfy the following relation:

$$28.5<V1-V2<42.0.$$

26. The optical image-capturing lens assembly according to claim 23, wherein a light ray having an incident angle of 36.5 degrees with respect to the optical axis and passing through the center of the stop intersects the image-side surface of the fourth lens element at a point, the perpendicular distance from the point to the optical axis is Yc1, half of the diagonal length of the effective pixel area of the electronic sensor is ImgH, and they satisfy the following relation:

$$0.35<Yc1/ImgH<0.95.$$

27. The optical image-capturing lens assembly according to claim 23, wherein half of the diagonal length of the effective pixel area of the electronic sensor is ImgH, the distance on the optical axis between the object-side surface of the first lens element and the electronic sensor is TTL, the thickness of the second lens element on the optical axis is CT2, and they satisfy the following relation:

$$2.50<TTL/(ImgH\times CT2)^{1/2}<4.35.$$

28. The optical image-capturing lens assembly according to claim 23, wherein the distance on the optical axis between the object-side surface of the first lens element and the electronic sensor is TTL, and it satisfies the following relation:

$2.20 \text{ mm} < TTL < 2.70 \text{ mm}$.

29. The optical image-capturing lens assembly according to claim 23, wherein the second lens element has a concave object-side surface.

* * * * *